United States Patent
Tharp et al.

(10) Patent No.: US 7,167,865 B1
(45) Date of Patent: Jan. 23, 2007

(54) COLLABORATIVE ENVIRONMENT FOR PRODUCING SOFTWARE PRODUCTS

(75) Inventors: Duane Tharp, Portsmouth, NH (US); James Konrad Tauber, Rossmoyne, WA (US); Biao Ren, Acton, MA (US); Clyde Christopher Logue, Portsmouth, NH (US)

(73) Assignee: mValent, Inc., Burlington, MA (US)

( * ) Notice: Subject to any disclaimer, the term of this patent is extended or adjusted under 35 U.S.C. 154(b) by 445 days.

(21) Appl. No.: 10/610,424

(22) Filed: Jun. 30, 2003

(51) Int. Cl.
*G06F 17/30* (2006.01)

(52) U.S. Cl. ............... 707/100; 707/101; 707/102; 707/103 R; 707/104.1; 717/101; 717/121; 717/127

(58) Field of Classification Search ............ 707/100, 707/103 R, 104.1, 101, 102, 103; 717/121, 717/101, 127; 703/13; 706/45; 714/38; 702/34
See application file for complete search history.

(56) References Cited

U.S. PATENT DOCUMENTS

| | | | | |
|---|---|---|---|---|
| 5,022,028 A | * | 6/1991 | Edmonds et al. | 714/38 |
| 5,706,405 A | * | 1/1998 | Short et al. | 706/45 |
| 5,949,999 A | * | 9/1999 | Song et al. | 717/127 |
| 6,138,104 A | * | 10/2000 | Marchak et al. | 705/9 |
| 6,477,471 B1 | * | 11/2002 | Hedstrom et al. | 702/34 |
| 2004/0073889 A1 | * | 4/2004 | Baecker et al. | 717/121 |
| 2004/0268293 A1 | * | 12/2004 | Woodgeard | 717/101 |
| 2005/0010386 A1 | * | 1/2005 | Tharp et al. | 703/13 |
| 2005/0125772 A1 | * | 6/2005 | Kohno | 717/104 |

FOREIGN PATENT DOCUMENTS

GB 2217070 A * 10/1989

* cited by examiner

*Primary Examiner*—Frantz Coby
(74) *Attorney, Agent, or Firm*—Joe Zheng

(57) ABSTRACT

Traditionally, a software product is produced through distinctive stages, such as development stage, quality control stage and a production stage, often resulting in difficulty of communications and lack of collaborations among the stages. To provide a true collaborative environment, techniques for creating a model are described. The model, in one perspective, is a collection of instances of environments needed for the stages to achieve a predetermined status of the software product. According to one embodiment, the model includes a plurality of first and second elements. Each of the first elements pertains to one of the instances and each of the second elements represents relationships between or among the first elements. Further the model may include a plurality of third elements, each carrying instructions or data. As a result, a model, accessible by each of the stages, provides a collaborative environment and is applicable to each of the stages, synchronizes changes and facilitates communications among the stages, thus greatly improving collaborations, communications and efficiency of producing the software product.

22 Claims, 17 Drawing Sheets

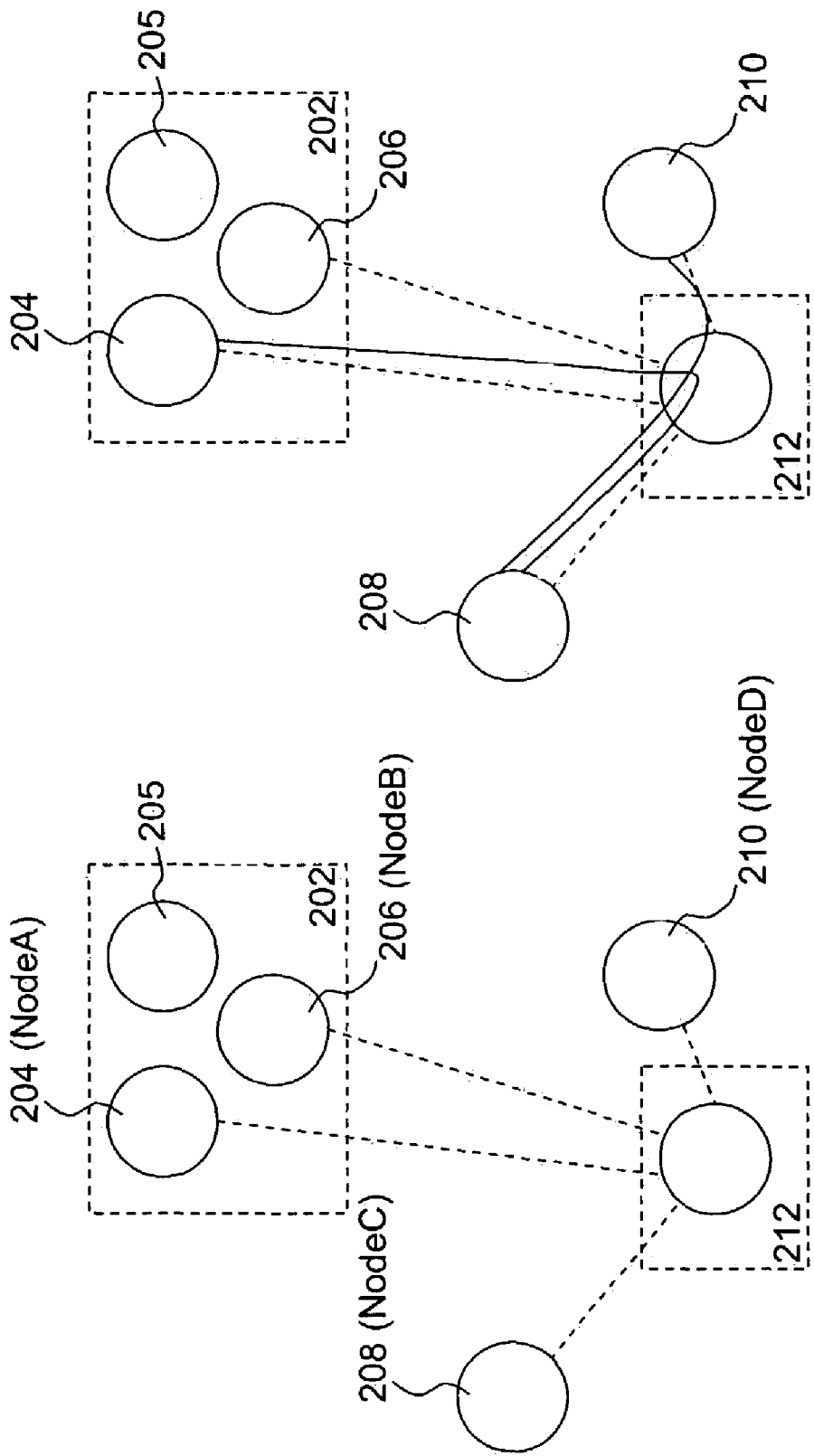

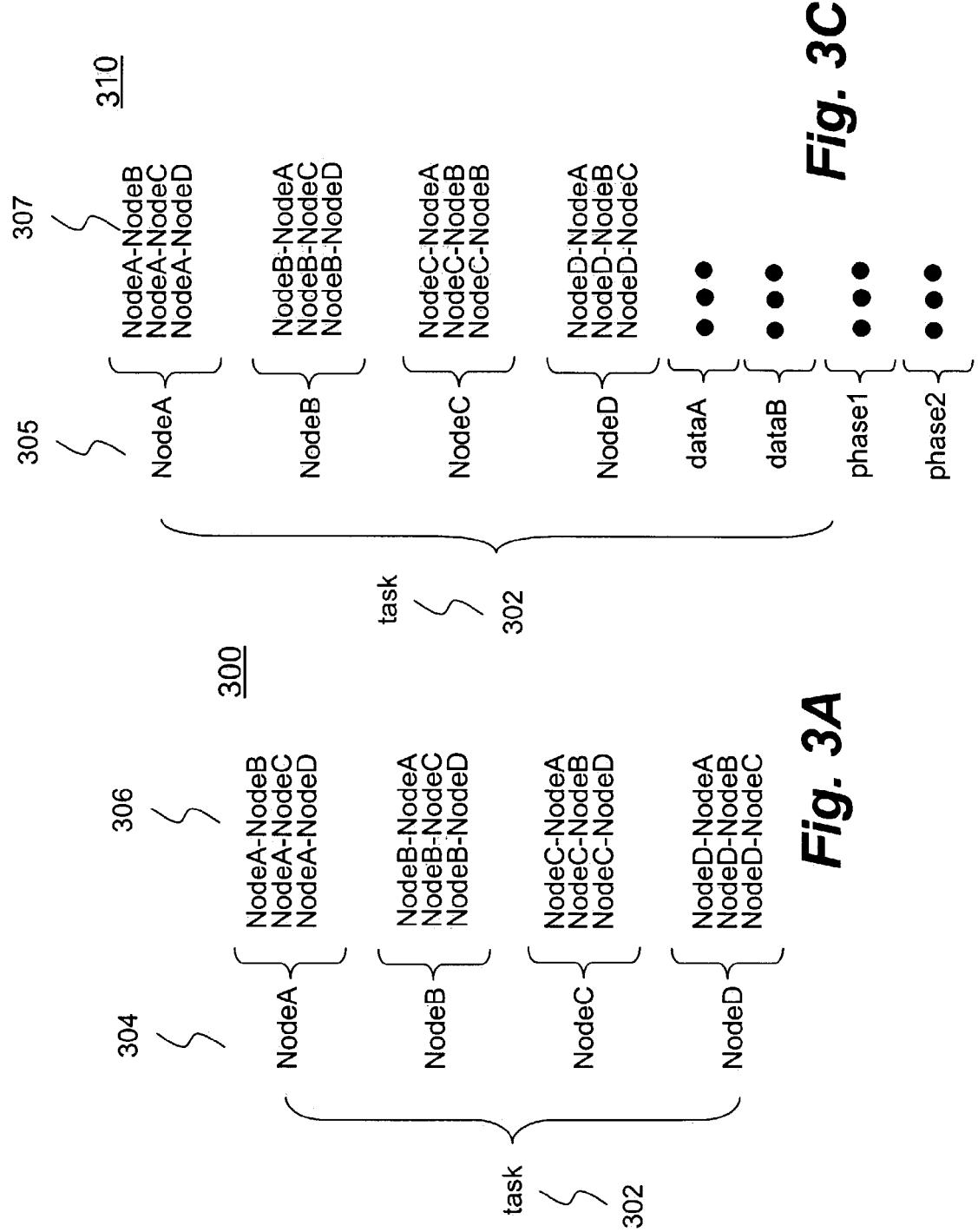

312
314

348

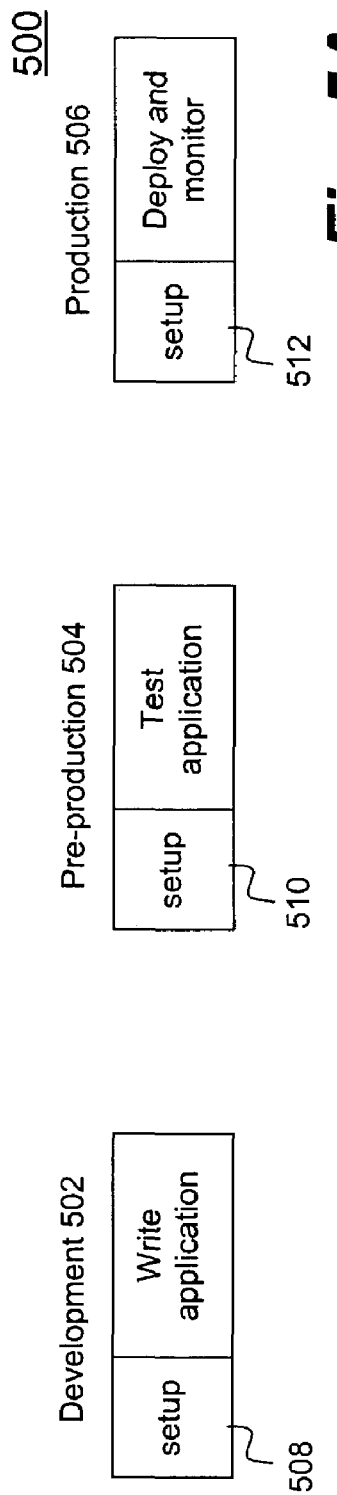
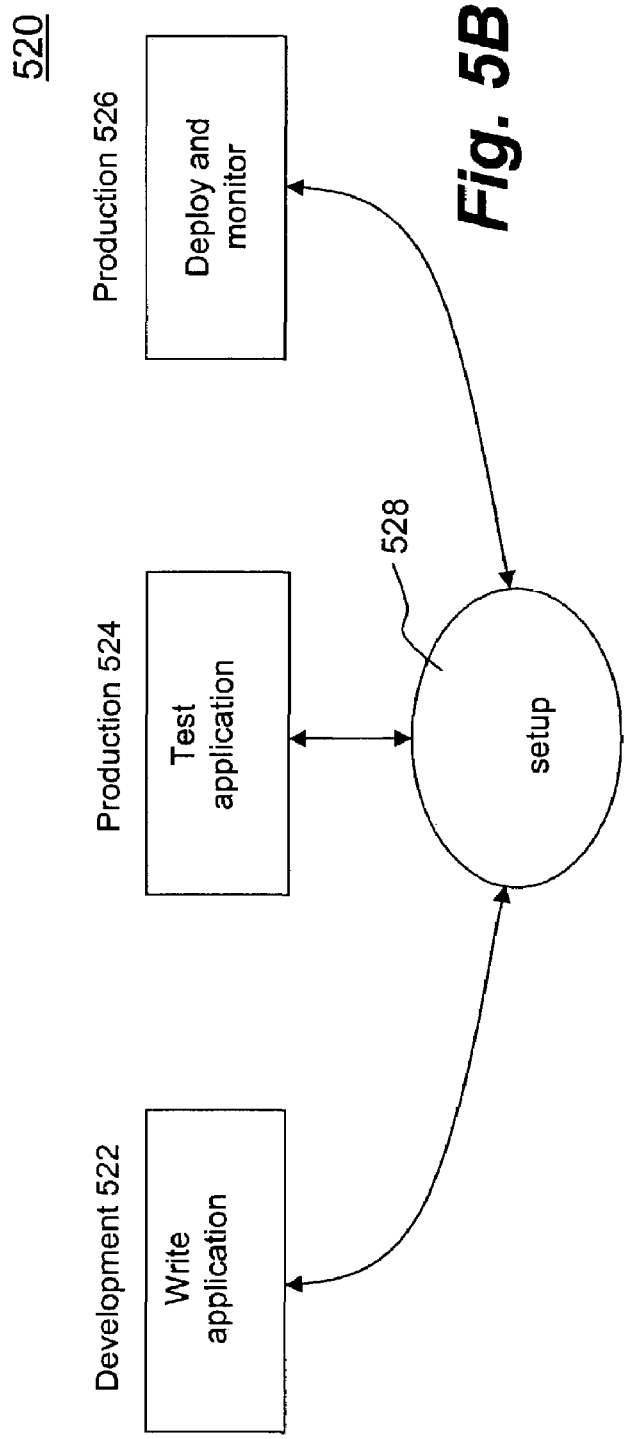
*Fig. 5A* (prior art)
*Fig. 5B*

COLLABORATIVE ENVIRONMENT FOR PRODUCING SOFTWARE PRODUCTS

BACKGROUND OF THE INVENTION

1. Field of the Invention

The present invention generally relates to the area of distributed systems over data networks. Particularly, the present invention relates to techniques for providing infrastructures to utilize distributed resources over data networks. More particularly, the present invention relates to a method and system for providing a model that centrically models distributed resources across one or more networks in accordance with a desired task, establishing direct communication sessions between two network nodes, managing applications depending on multiple resources, and a method, a process, and a system for providing a synchronized environment for producing software products, wherein the synchronized environment is based upon a logic model of a collection of different stages or phases in deploying the software products.

2. Description of the Related Art

IT (information technology) is a term that encompasses all forms of technology used to create, store, exchange, and use information in its various forms (e.g., business data, voice conversations, still images, motion pictures, multimedia presentations, and other forms). IT is a strategic resource to a company. Dynamic use of IT can dramatically reduce costs and thereby improve a company's operating margin, accelerate the time to market for new products and services a business may offer, increase response times for internal and external customers, improve system reliability, up time, and availability.

There are tremendous pressures in today's IT environment. The pressures come from the convergence of at least three major forces: the rapid transition toward distributed applications, a massive surge in new deployments, and the current confined economic climate. "Do more with less" becomes the mantra of the IT operations. On top of that, IT operations are increasingly required to show how they can efficiently support critical business functions and processes without impacting other functions within a business.

A fundamental shift is underway in IT operations as corporations move increasingly away from monolithic, legacy applications and infrastructure towards a distributed business application infrastructure. However, with such a vast amount of distributed resources available on a network (e.g., the Internet), it becomes a forbidden endurance to just manage a fractional number of these resources that may be undergoing constantly updates and changes. There thus has been a tremendous need for mechanisms to determine what resources are needed and manage these selected resources dynamically and intelligently.

Nevertheless, there are considerably complexities to utilize the distributed resources over a network, such as the Internet. Globally or even in a region or community, the computational capability as a whole is enormous and even grows daily, the resources actually available to a given task are limited, largely due to poor or nearly non-existent management of the resources. Essentially, the resources are sporadically distributed on a network and may be remotely located with each other. Peer-to-peer (or P2P) networking may be an exemplary mechanism to facilitate the use of the distributed resources, though the most mature application areas of the P2P technology are file sharing and instant messaging. Among other ongoing efforts to use the distributed resources, dynamic replications of the distributed resources or static links of the distributed resources in a centralized location are quite common. However, these approaches have been proved inefficient and are incapable of putting up with the dynamic changes of the resources across the network. For many applications, such as IT infrastructure monitoring across an enterprise and collaborative software developments, all distributed resources must be dynamically used and synchronized without impacting others on the network. There thus is a need for solutions or means that facilitate the efficient and better use of the distributed resources.

Management of enterprise web application environments is an example that currently requires extensive resources. The ever increasing complexity inherent in multi-tier architectures of web applications presents a forbidden task to make changes to any of the environments. Often the small change to a local environment can cause rippling effects on the entire enterprise web application environments. As an enterprise, for example, extends its service reach to improve business processes and consolidate to lower operating expenses, the number of application components increases, the application infrastructure can become very complex and the task of managing changes in such environment becomes even more difficult. It is desirous to have tools that can provide visualization of the infrastructure to facilitate the management of the application components.

While it has been known that the next generation of software products will encompass web services, mobile devices, smart agents, desktops and servers, collaborating seamlessly across a network. Developing products like this magnitude and complexity will require a sophisticated setup environment for each different stage. There are at least three collective stages; development, quality control and production. Currently, each stage is provided with its own setup, a development setup, a quality control setup and a production setup. As a result, collaborations, communications and efficiency are limited among the stages, resulting in a prolonged delay in actual deployment, frustrations to the customer, and increased support burden associated with deploying a value-added business solution.

Largely, installing and configuring a particular setup for a software product that depends upon other system components, such as a database and a remote resource, can be difficult and time consuming. A person who designs a setup for one stage may not have the skills or knowledge required to complete the setups for other stages, thus often resulting in separate and different setups for all stages involved in producing the software product. There is thus a need for a collaborative setup or environment that can facilitate the needs in all stages.

SUMMARY OF THE INVENTION

This section is for the purpose of summarizing some aspects of the present invention and to briefly introduce some preferred embodiments. Simplifications or omissions in this section as well as in the abstract or the title of this disclosure may be made to avoid obscuring the purpose of this section and the abstract/title. Such simplifications or omissions are not intended to limit the scope of the present invention.

The present invention is related to processes, systems, architectures and software products for modeling resources distributed across a network, communication means to support for modeling resources in a distributed and collaborative manner, managing applications depending on multiple resources, and providing a centric and synchronized environment for setting up and producing software products in different phases or stages. According to one aspect of the present invention, a model is initiated as a project model and finished as a logic model at a rendezvous to include spaces or elements, each of the elements corresponding to a node (e.g., an instance of a resource), relationships between or among the elements, or including instructions or data. In other words, a logic model, or simply, a model is a collection of elements and relationships between the elements, and centrally modeling a collection of resources for a given task.

A model can have a different meaning given a different context. By virtue of the present invention, a model can be presented in many ways depending on how the model is used. According to one embodiment, a model is provided as an abstraction mechanism for modeling resources that tie to physical entities and/or virtual entities that may or may not have any physical representation. According to another embodiment, a model is essentially a collection of metadata about one or more resources. According to still another embodiment, a model can include data objects, processes or instructions as well. According to still another embodiment, a model may have a set of constraints which become part of the model's metadata. In addition, a model can be configured to include rules either pre-defined or added dynamically. Constraints and rules may be extended to give a set of instructions for visualization of the model.

According to another aspect of the present invention, a model is created or configured to include a collection of metadata to model a dynamic system that utilizes resources in a distributed network. There are at least two representations of a model, a logical model that represents the abstraction of various elements and their relationships, and a physical model that represents the physical resources.

According to still another aspect of the present invention, the elements in the model are categorized into a number of classes, thus to represent the relationships between the elements in N-dimension, wherein N is the number of classes. Mechanisms are provided, based on a query or queries, to extract a visualization out of the N-dimension such that at any time a particular or desired perspective of the relationships of the resources can be provided in accordance with the query or queries.

According to still another aspect of the present invention, direct communications sessions are respectively established among a plurality of nodes. These nodes may join to collaboratively develop, manage and update a model of a collection of resources, provide support and other means to accomplish a model or communicate between each other through a common model. With established direct communication sessions, data or sources in one node can be transported to and synchronized in another node. According to one embodiment, various types of access control can be provided to control the communications with there nodes, for example, to retire a session with a node, limit or control certain types of accesses from a node.

According to still another aspect of the present invention, an established model for setup is applied to applications of producing software products. Instead of providing distinctive setup for each of stages involved in producing software products, the model provides a centric environment or setup that is applicable to each of the stages, synchronizes changes and facilitates communications among the stages, thus greatly improving collaborations, communications and efficiency among the stages.

According to yet still another aspect of the present invention, a model is created to model all resources in one or more files supporting an application (e.g. a website) depending on the resources and provide a visualization of relationships among the resources such that a collaborative platform is provided for management of the resources for the application.

The present invention may be implemented as a system, an architecture or process, or employed in software, hardware or a combination of software and hardware. In addition, there are numerous benefits, features and advantages in the present invention. One of these benefits, features and advantages is the mechanism provided in the present invention to model distributed resources for a given task in a collection of elements referred to as a model. The model is generic enough and can be configured to accomplish a task or tasks that are otherwise difficult to be done in a single or isolated computing environment.

Another one of these benefits, features and advantages is that a true collaborative environment can be established through a model of a collection of elements pertaining to resources distributed across a network.

Other objects, benefits, features, and advantages together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 2A illustrates a collection of nodes in which each node represents a resource or an instance of the resource;

FIG. 2B shows that original unrelated nodes can now communicate each other via a model of a collection of elements, each pertaining to a node;

FIG. 3A shows an exemplary model in reference to FIG .2A and in accordance with one aspect of the present invention;

FIG. 3C shows an improved model over that shown in FIG. 3A and includes additional four elements dataA, dataB, phase1 and phase2;

FIG. 5A shows an exemplary configuration for deploying a software product;

FIG. 5B shows one aspect of the present invention that can be used to solve or minimize many of the problems that may be experienced in FIG. 5A, instead of having a different setup for each of the stages, a centralized setup based on a model modeling the stages is provided;

DETAILED DESCRIPTION OF THE PREFERRED EMBODIMENTS

Figure 1A:
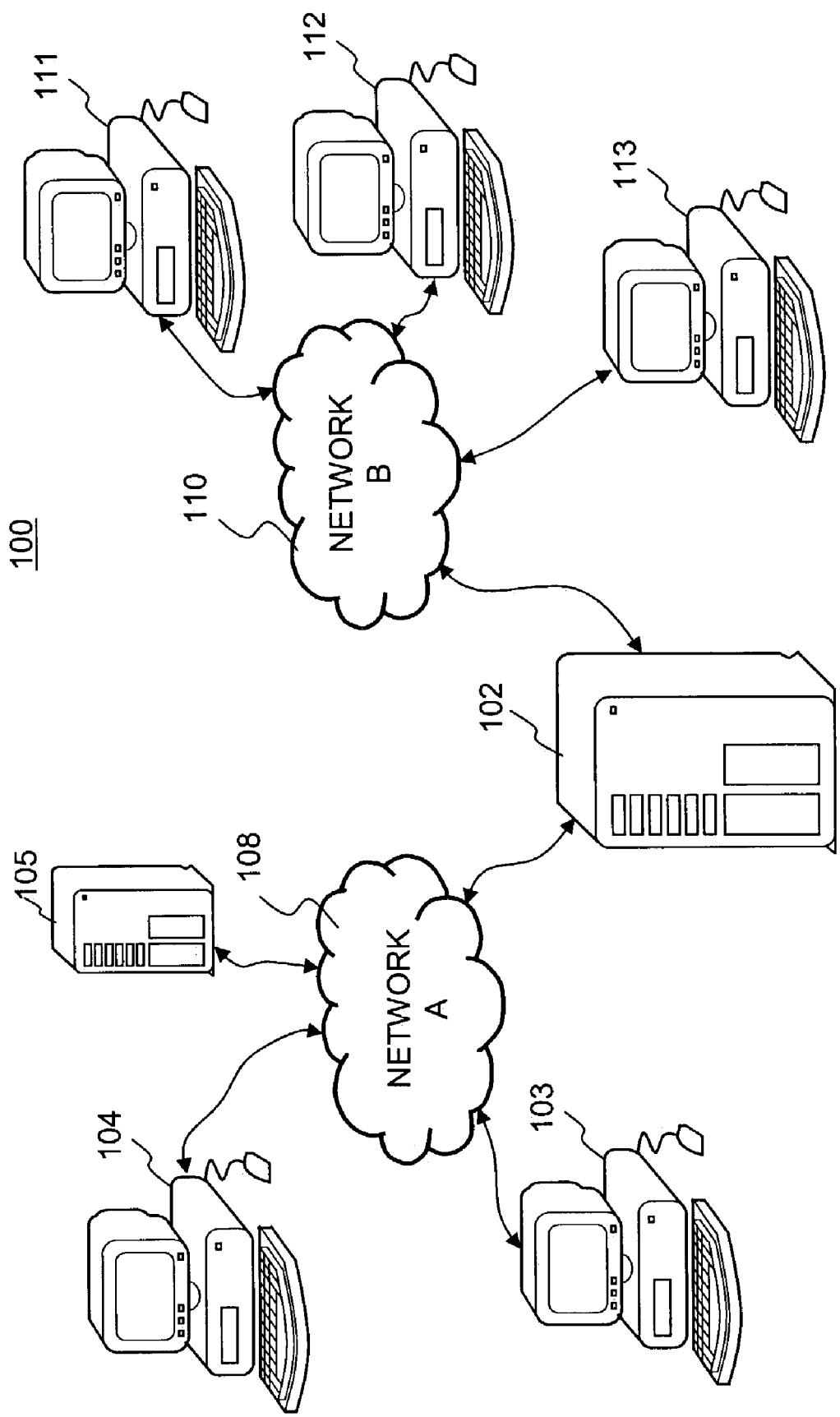
FIG. 1A shows a basic system configuration in which the present invention may be practiced in accordance with one embodiment of the present invention.

The present invention is related to processes, systems, architectures and software products for modeling resources distributed across a network, communication means to support for modeling resources in a distributed and collaborative manner, providing a synchronized environment for producing products, and a collaborative platform for managing multiple resources for an application. According to some aspects of the present invention, a model is created as a collection of spaces or elements that at least one of the elements pertains to an instance of a resource or a relationship between or among resources being modeled. In one embodiment, a graphic environment is provided to facilitate the modeling process and the establishment of the relationships between the elements. In another embodiment, a command line interface (CLI) is provided to facilitate the modeling process and the establishment of the relationships between the elements. In one respective, the mechanism behind the graphic or CLI environment is respective direct communication sessions established with the resources such that the model is dynamically updated and synchronized.

According to another aspect of the present invention, a modeling process is extended to establishing a centric environment of producing software products involving a number of progressive or collaborative stages. A model is provided as the centric environment (e.g. a setup) to include resource instances of each of the stages thus all stages proceed with respective tasks in accordance with the same model. As a result, collaborations, communications and efficiency are greatly improved or maximized among the stages, resulting in a shortened time in actual setup and deployment, satisfactions to the customer, and minimized support burden associated with deploying a value-added business solution. Other aspects of the present invention may be appreciated in the detailed description herein.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding of and describe the present invention according to an embodiment. The definitions may appear to include some limitations with respect to the embodiment, the actual meaning of the terms has applicability well beyond such embodiment, which can be appreciated by those skilled in the art given the detailed description of the present invention.

Resource may represent, but not be limited to, a process, an application, a type of source, content, service or machine configured to provide supports to or facilitate a desired task or tasks that can be achieved in a distributed and collaborative manner. For example, a database is a resource, a web service is a resource, and a human (via a computer) is also a resource.

Computing device, computer, or machine, interchangeably used herein, is a physical device. For example, as a server, a machine can host various resources, as a client, a machine can be used to access various resources over a network, or as one of a group of machines to contribute to a task that can be achieved by the group of machines in a distributed and collaborative manner.

Host is a machine hosting, executing, providing one or more resources.

Node is an instance of a resource, and in general, is network addressable. A machine may be configured to provide multiple resources, and hence there may be more than one node in a machine. Likewise, there may be multiple resources on a node. For example, there can be multiple users on a node, each user defines the boundary of set of elements resident on a node.

Model is a collection of spaces, metadata, nodes or elements representing one or more resources and relationships thereof, and may be configured to achieve a desired task, execute a project, instruct another machine to perform accordingly or act as a node in another model. A model can have a different meaning in a different context.

Embodiments of the present invention are discussed herein with reference to FIGS. 1A–6. However, those skilled in the art will readily appreciate that the detailed description given herein with respect to these figures is for explanatory purposes as the invention extends beyond these limited embodiments.

FIG. 1A shows a basic system configuration in which the present invention may be practiced in accordance with one embodiment thereof. There are a plurality of machines (only 102–105 are shown) coupled to a network 108 that may be a public or a private network (e.g., the Internet or a local area network). Each of the machines 102–105 operates independently from others but may provide one or more resources that other machines may need to accomplish a task. For example, the machine 102 is configured to execute an application that requires a number of resources to support the execution. The machine 102 is not supplied with all of the resources but can be configured to take advantage of the distributed resources in other machines, such as the machines 103–105. Each of the machines 103–105 may be a server computer, a desktop computer or any other type of computing devices.

The machine 102 is accessible by other machines (e.g., the machines 111–113), for example, to execute an application, provide a type of service, data or content. In operation, the model in the machine 102 is accessed as an instance that in return provides distributed computational capacity. The machines 111–113 are coupled to a network 110 that may be the same as the network 108 or a different network. In general, the machines 111–113 are accessed by human operators to perform certain tasks via the machine 102.

Depending on implementation, each of the machines 102–105 and 111–113 is loaded with one type of an executable version of one embodiment of the present invention or configured in accordance with the present invention such that a high efficient collaboration computing environment can be achieved.

Figure 1B:
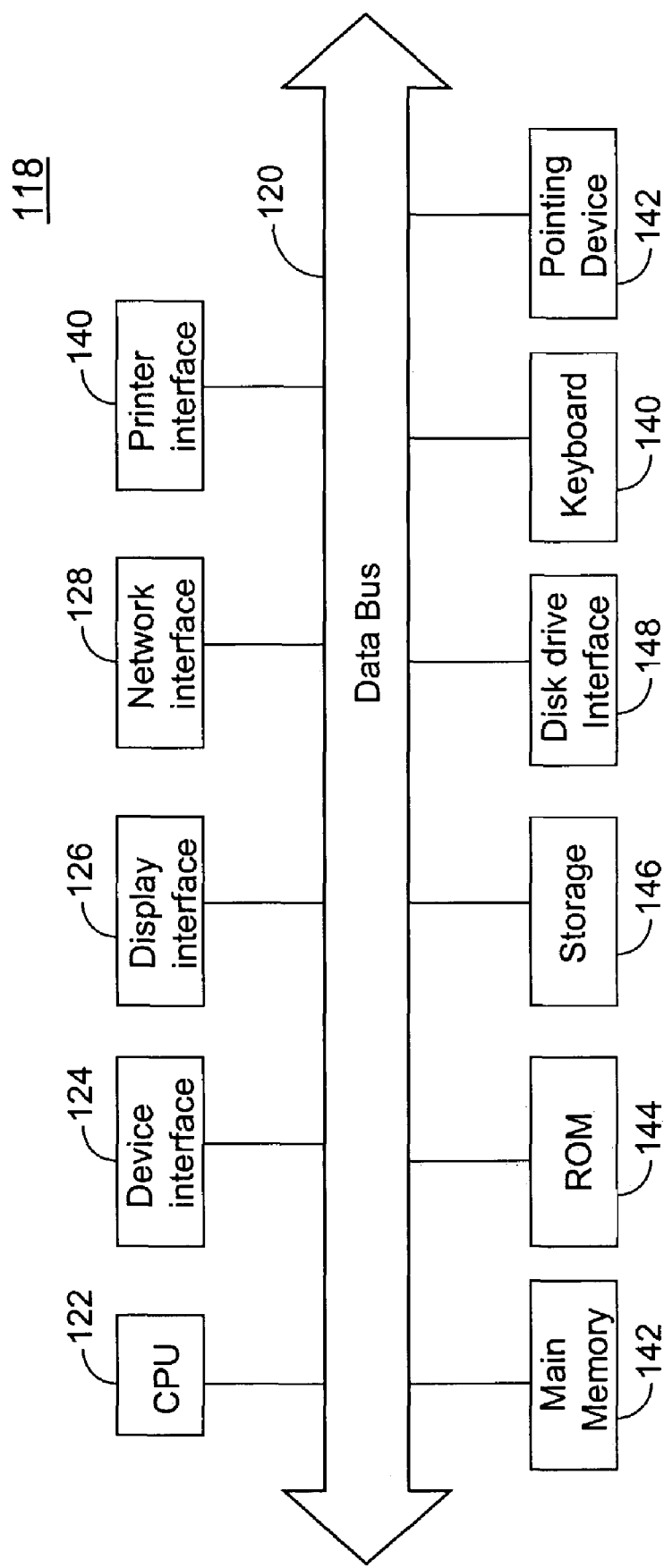
FIG. 1B shows internal construction blocks of a system in which the present invention may be implemented and executed to achieve desired results contemplated in the present invention.

FIG. 1B shows exemplary internal construction blocks of a system 118 in which the present invention may be implemented and executed. The system 118 may correspond to one of the machines shown in FIG. 1A. As shown in FIG. 1B, the system 118 includes a central processing unit (CPU) 122 interfaced to a data bus 120 and a device interface 124. The CPU 122 executes certain instructions to manage all devices and interfaces coupled to data bus 120 for synchronized operations and the device interface 124 may be coupled to an external device such as another computing machine hence one or more resources in the computing machine may be utilized. Also interfaced to the data bus 120 is a display interface 126, a network interface 128, a printer interface 140 and a disk drive interface 148. Generally, a complied and linked version or an executable version of one embodiment of the present invention is loaded into the storage 146 through the disk drive interface 138, the network interface 128, the device interface 124 or other interfaces coupled to the data bus 120.

The main memory 142 such as random access memory (RAM) is also interfaced to the data bus 120 to provide the CPU 122 with the instructions and access to memory storage 146 for data and other instructions, applications or services. In particular, when executing stored application program instructions, such as the complied and linked version of the present invention, the CPU 122 is caused to manipulate the data to achieve results contemplated by the present invention. The ROM (read only memory) 144 is provided for storing invariant instruction sequences such as a basic input/output operation system (BIOS) for operation of the keyboard 140, the display 126 and the pointing device 142, if there are any. In general, the system 118 is coupled to a network and configured to provide one or more resources to be shared with or executed by another system on the network or simply as an interface to receive data and instructions from a human being.

FIG. 2A illustrates a collection of nodes 200 in which each node represents a resource or an instance of the resource. Each of the nodes is identified by an identifier and configured to include a mechanism (e.g., a software agent or a pointer) used to address or access the resource or a specific computer that the resource is hosted in. Depending on the nature of a node or a resource a node pertains to, the node can be identified by a network address (e.g., a uniform resource identifier or URI) or a direct link. According to one embodiment of the present invention, the identifier includes an address and a specific name of the resource. As further detailed below, with the identifier and an appropriate communication protocol, direct communication between two nodes (e.g. between the nodes 202 and 212) is possible thus sources in one node can be synchronized with those in another node.

According to one aspect of the present invention, a model is created to model those nodes that can be used to facilitate a desired task or tasks in a distributed and synchronized manner. The model is typically created at a rendezvous to model the nodes. The rendezvous itself may be node, or a machine and accessible by other resources, nodes or machines.

For example, a machine 202 provides three nodes 204–206 while two nodes 208 and 210 are respectively from two separate machines. All of the machines are coupled to a network. A rendezvous is created (e.g., at the node 212 as shown in the figure) and is configured to dynamically model each of the nodes 204, 206, 208 and 210 such that the rendezvous can be readily utilized to accomplish a task without having to have all resources available at one location. In essence, the rendezvous virtualizes the resources at one location but is depending on the nodes 204, 206, 208 and 210 in a distributed fashion. Likewise, by utilizing the model at the rendezvous, the nodes 204, 206, 208 and 210 can readily communicate between or among themselves objectively as shown in FIG. 2B in which the nodes 204 and 208 communicate each other and the nodes 208 and 210 communicate each other, all via the model at the rendezvous, thus indirection communication between nodes via a model is now possible.

Alternatively, each or some of the nodes 204, 206, 208 and 210 represents a model (that may represent a collection of resources), thus a new logical model can be established (e.g., at the rendezvous) to represent these models or resources by certain operations (e.g., aggregation). In other words, a new logic model can be created and shared on each or all of the nodes 204, 206, 208 and 210, the logic model itself could represent a task or process and provides an abstraction in modeling a task in a distributed network.

Figure 2C:
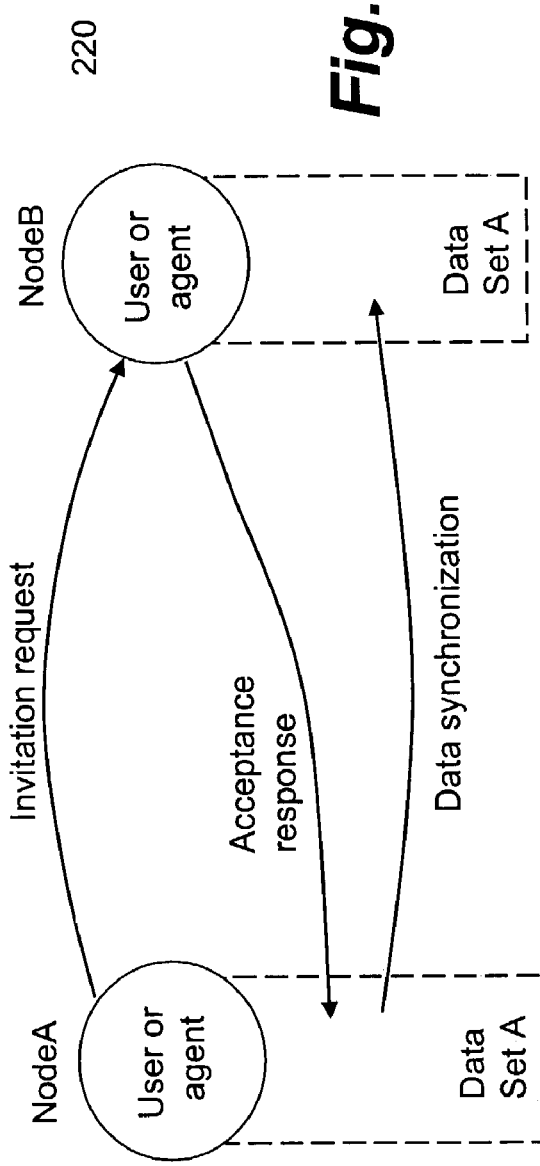
FIG. 2C illustrates a communication diagram between two nodes NodeA and NodeB for establish a direct communication session.

FIG. 2C illustrates a communication diagram 220 between two nodes NodeA and NodeB. To establish a direct communication link or session between the two nodes, one of the nodes is configured to initiate a session, for example, by sending an invitation request from NodeA to NodeB. According to one embodiment and as further described below, the invitation request is initiated in a model to facilitate the direction communication between two nodes. Depending on implementation, the invitation request may include criteria and/or access control information. The criteria pertain to what NodeA desires from NodeB while the access control information pertains to how NodeB can participate. If NodeB accepts the invitation requests, NodeB returns an acceptance response to facilitate the establishment of the session. The communication protocol for such session may include, but not be limited to, Groove (see www.groove.net) and JXTA (see www.jxta.org). After the session is established, both NodeA and NodeB are synchronized on the task being worked upon.

To further understand aspects of the present invention, it is assumed that NodeA is being accessed by a user to establish a model for a task therein. It should be noted that the model itself can be an instance represented by NodeA that can be called upon as a resource to join other models. According to one embodiment, the model is depicted as a space or a data set A in FIG. 2C. The model requires a resource provided from NodeB that may be remotely located with respect to NodeA over a network (e.g., the Internet), or NodeB is invited to work together with NodeA on the model. Accordingly, NodeA is configured to send an invitation request (e.g., by a user or a software agent) to NodeB. Upon receiving the invitation request, NodeB determines whether to join NodeA to participate the task in a collaborative manner. It is now assumed that NodeB is present online and accepts the invitation request and responds to the invitation request with an acknowledgement to thus establish a direct communication session with NodeA. With the established session, the data set A is pushed or transported to NodeB over the network. Although there appear two copies of the data set A on either one of the nodes, they are synchronized, an action to the data set on one end is synchronously or asynchronously reflected on the other end.

Further, as will be appreciated herein, the communication session can be made to be subject conditions that may be imposed by NodeA and/or NodeB. Depending on implementation, there may be various types of conditions that control the communication between NodeA and NodeB. For example, the session is expired at a specific time, NodeB is no longer part of the model after a certain time, NodeA or NodeB may receive, transmit or communicated a certain type of data. In addition, security clearance may be employed in the communication session to ensure that only an authenticated or recognized source may be shared in the model.

Figure 2D:
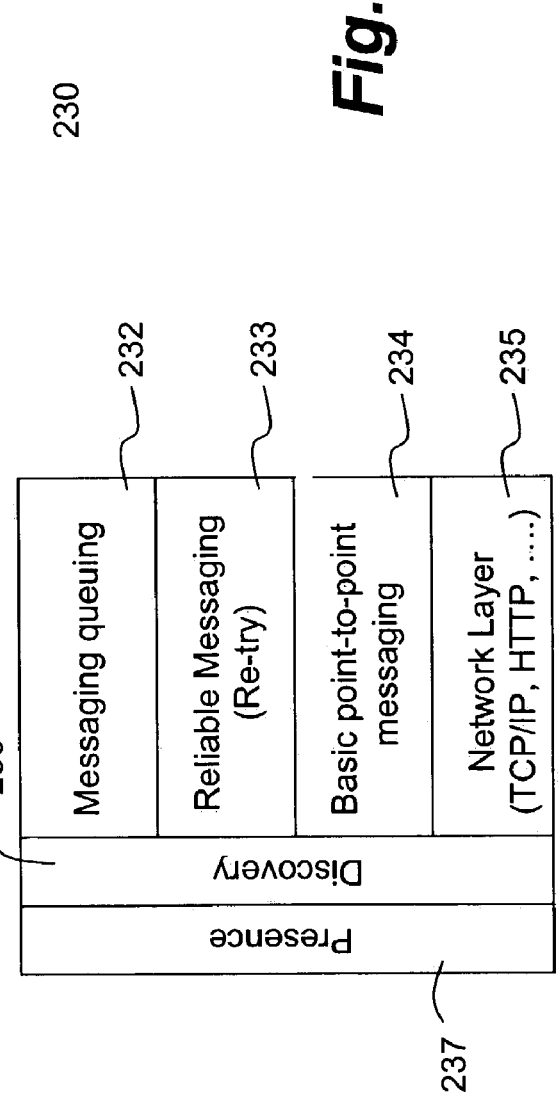
FIG. 2D shows an exemplary messaging mechanism that may be used in a direct communication session between the two nodes.

FIG. 2D shows a messaging mechanism 230, according to one embodiment, to facilitate the establishment of the communication session and direct communication between NodeA and NodeB. There are six layers or blocks 232–237 in the messaging mechanism or component 230. Blocks 232–235 represent respective stacks for a message to get sent. In other words, every message goes through the network layer 235, the basic point-to-point messaging layer 234, the retry layer 233 and the queuing layer 232 if applicable. The detection of node presence and discovery of nodes 236 and 237 is required and affects the operations of these stacks.

In general, the network layer 235 covers the network aspect of sending a message. The underling protocol could be TCP/IP, HTTP or some other protocol, which is known to those skilled in the art. According to one embodiment, the network layer 235 includes the set of JXTA Functions that provides basic capabilities to establish a communication session (e.g., a JXTA pipe), and endpoint node address for sending a message, and basic send/receive packets over the established session. Each node has a name and is uniquely identified by an identifier across a network. In addition, a node is bound to a network endpoint to make it addressable for messaging purpose, detectable for presence, and discoverable across the network. Point-to-point (1:1) messaging through the basic point-to-point messaging layer 234 can be used to handle broadcasting or multicasting messages to multiple nodes (1:N).

The retry layer 233 provides capabilities of ensuring that a message (e.g., data) is guaranteed to arrive at an intended destination. There are at least two possible causes that a message is not delivered. First, the message never arrives at an intended destination (e.g., NodeB), due to a network problem or problems at a sending node. The second case may be that the receiving node is having problems sending an acknowledgement response or there are network problems preventing it from sending the message. In any case, the retry layer 233 ensures that a message is delivered to a node while a receiving node is configured to recognize and ignore duplicated messages (same message sent multiple times).

As described above, the nodes are distributed across a network and can be located remotely with respect to each other. There may not be any control over the operation of these nodes. Therefore, nodes can be online and offline in a very unpredictable manner in addition to other scenarios in which nodes are not responsive. The queuing layer 232 provides a mechanism to queue messages if the message could not be delivered.

Figure 2E:
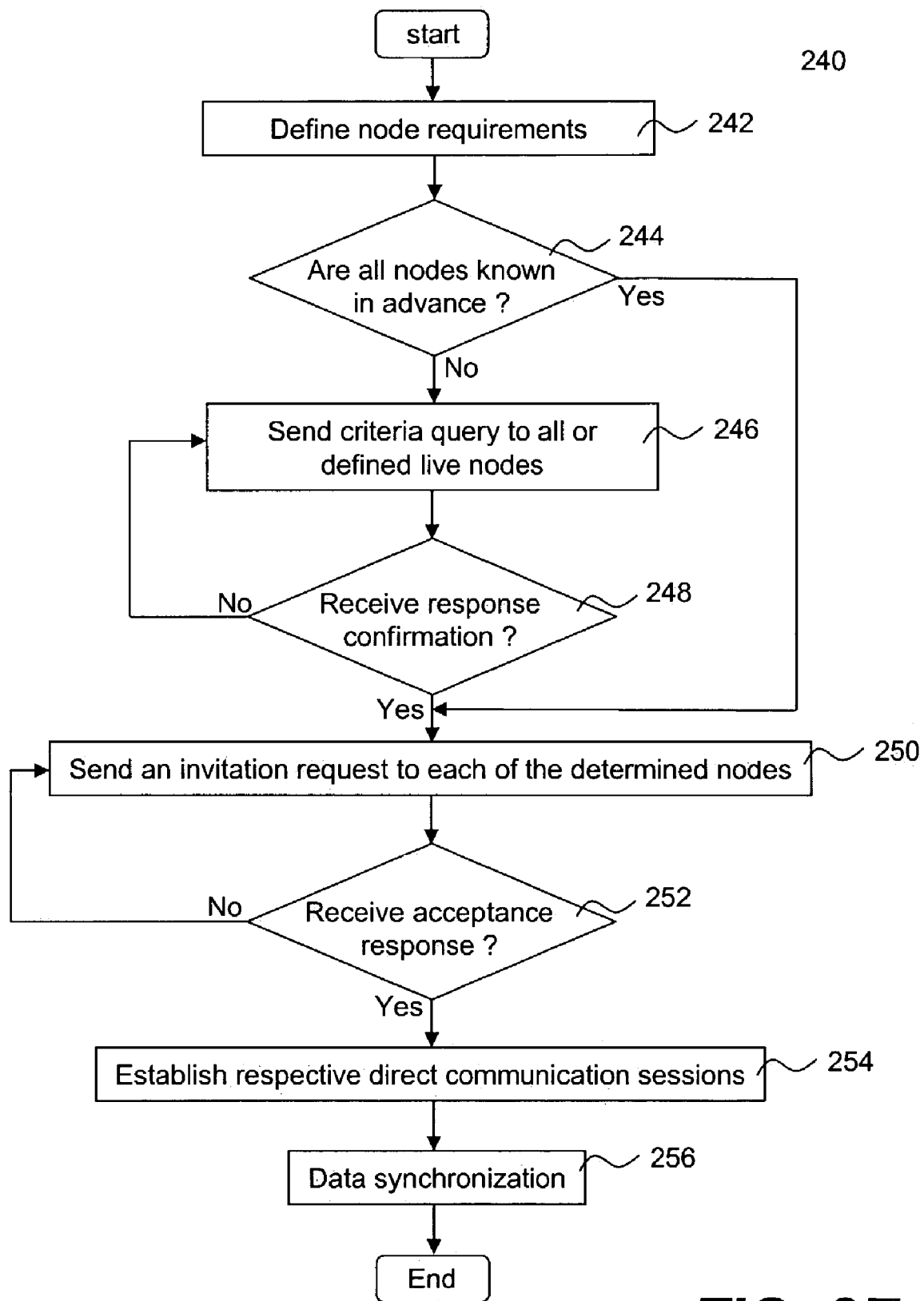
FIG. 2E shows a flowchart or process of establishing a direct communication session between two nodes and may be further understood in conjunction with FIG. 2C.
Figure 4A:
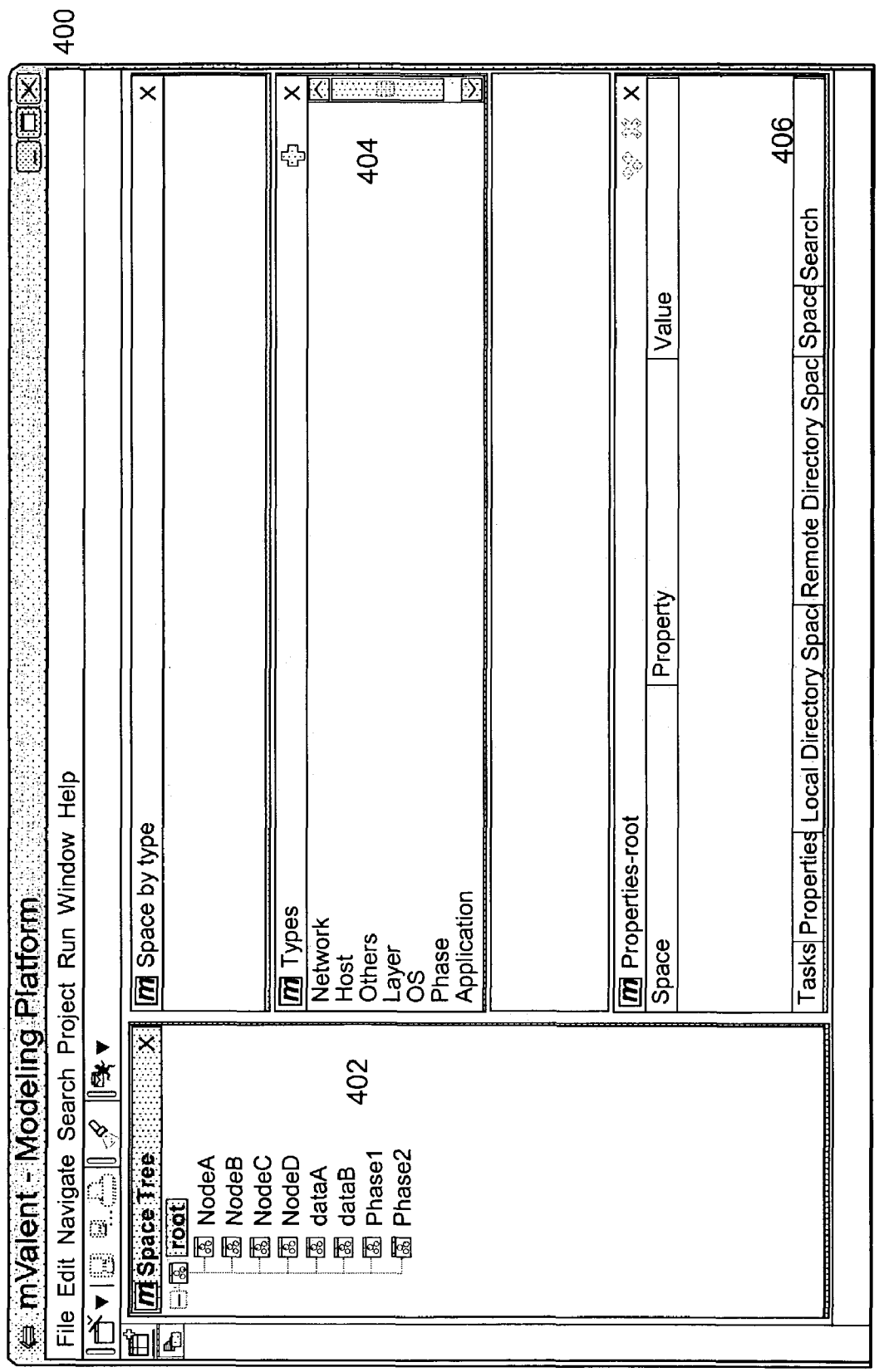
FIG. 4A shows an exemplary graphic environment that may be used to create a logic model of FIG. 3C.
Figure 4B:
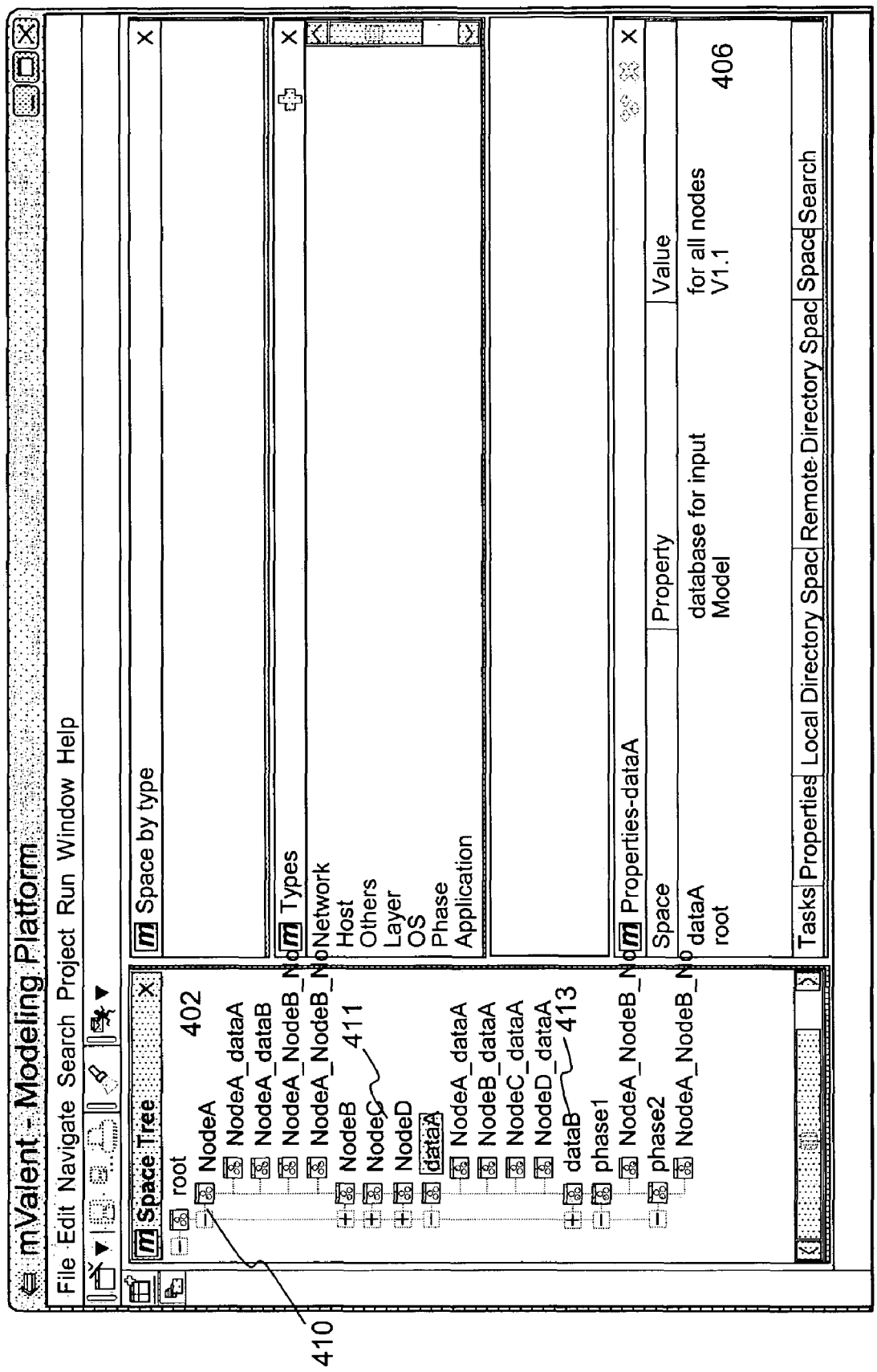
FIG. 4B shows that the model is partially expanded and the relationships between some of the elements can be seen in a display of the graphic environment of FIG. 4A.
Figure 4C:
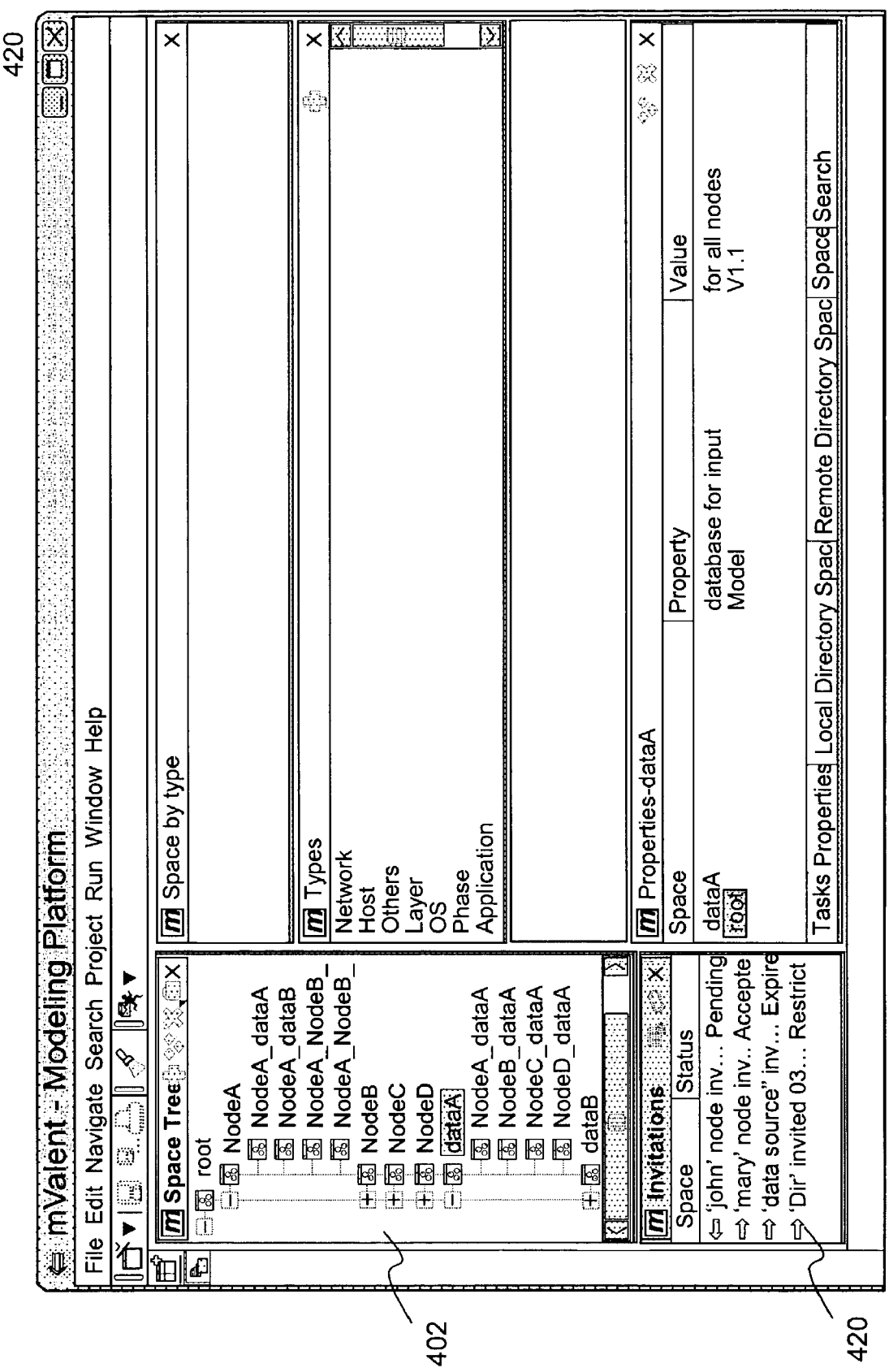
FIG. 4C shows another display in the graphic environment that shows a number of nodes have been invited to participate the development, management or updating of the model.

FIG. 2E shows a flowchart or process 240 of establishing a direct communication session between two nodes and may be further understood in conjunction with FIG. 4C. Given the description herein, it can be appreciated by those skilled in the art that process 240 can be implemented in software, hardware, or a combination of software and hardware.

There are at least two events that will require a direct communication session be established between two nodes. First, a model is being collaboratively developed, managed, shared or updated by more than one node, in which case, a respective direct communication session will be needed between a hosting node and each of the participating nodes. Second, when a model requires resources distributed among multiple nodes, a respective direct communication session will be needed between the model (i.e., a node thereof) and each of the multiple nodes. In addition, a direct communication session becomes possible between two nodes via the model by establishing multiple direct communication sessions with the model, wherein the two nodes would not otherwise communicate or know each other.

In any case, at 242, the node requirements are determined. As described above, the node requirements may be pertaining to distributed resources needed to accomplish a task or those invited to collaboratively accomplish the task, manage, share or update a model related to the task. Regardless of the purposes of these nodes, at 244, it is determined whether these nodes are known in advance, or in other words, whether the respective address identifiers of these nodes are known. In the case that these nodes are not known, at 246, one or more criteria queries are configured and sent to all or defined nodes. A query may contain one or more keywords, metadata or desired features or nature of a resource. In one embodiment, such query is broadcast to all nodes that are live at the time of the broadcasting. In another embodiment, such query is multicast to a set of defined nodes, for example, in a region, a community or an organization. Understandably, only those nodes that are online or live receive the query or queries. In a case in which one or more nodes that are demanded or desired are offline, queries for the offline nodes are queued and delivered when those nodes come back online unless alternative nodes are located or a particular term is expired. At 248, those nodes that receive the query determine whether the resources pertaining thereto satisfy the query or they are permitted to provide the resources or in what conditions. If no responses are received, the process may go from 248 to 246 to send another query, which may subsequently receive responses as some nodes are turned back online in some other times.

It is assumed that at 248, respective responses are received in response to the query or queries, and the process 240 now goes to 250 in which the responding nodes are selected if there are choices. Referring back to 244, if the nodes are known in advance in accordance with the requirements, the process 240 goes directly to 250. Now the nodes are determined, a respective communication session is initiated (e.g., in the model) with each of the nodes (selected) by sending an invitation request to each of the nodes. At 252, it is now up to the nodes that have received the invitation request to determine if they want to accept the invitation, be part of the model, or join to collaboratively accomplish a task. Depending on the configuration or setting on the nodes, some may be restricted while other may be free to participate in anything. If no response is received from a required node that is needed in a task, another invitation may be sent thereto. It is assumed at 252 that necessary responses have been received.

The process now goes to 254 in which those nodes that are determined to accept the invitation requests respond with an acceptance response. In general, the response includes an address identifier of the node or an address identifier of another node that is designated by the node. With the established sessions, data are synchronized accordingly between or among the nodes.

Referring now to FIG. 3A, there shows an exemplary model 300 in accordance with one aspect of the present invention and that may be in reference to FIG. 2A. The model 300 can be created at a rendezvous (e.g., in node 212). The model 300 extends from a root 302 to include layers of elements, each layer including a number of elements. Alternatively, the model 300 may be viewed as a graph or tree structure providing a mechanism to group the elements hierarchically. Each of the elements may include a number of sub-elements and each of sub-elements may further include a number of elements and so on.

For illustration purpose, each of the elements 304 under the root 302 is named after the participating nodes 204, 206, 208 and 210 of FIG. 2A, or NodeA, NodeB, NodeC and NodeD, and hence referred to as primary elements. Under each of the primary elements NodeA, NodeB, NodeC and NodeD, there are sub-elements describing relationships 304 between the primary elements. For example, an element NodeA-NodeB shows that it is an element of a relationship between two elements NodeA and NodeB while the element NodeC-NodeA shows that it is an element of a relationship between two elements NodeC and NodeA. Logically, the elements NodeA-NodeB and NodeB-NodeA are inherently one identical element but presented differently for easy visualization. To distinguish from the primary elements NodeA, NodeB, NodeC and NodeD, it is sometimes herein to refer to those elements of relationships (e.g., the elements NodeA-NodeB and NodeC-NodeA) as relationship elements. It should be noted that a relationship element is not limited to a relationship between two elements. Depending on an actual application of the model, a relationship element may represent relationships among several elements or a relationship of the relationships.

Figure 3B:
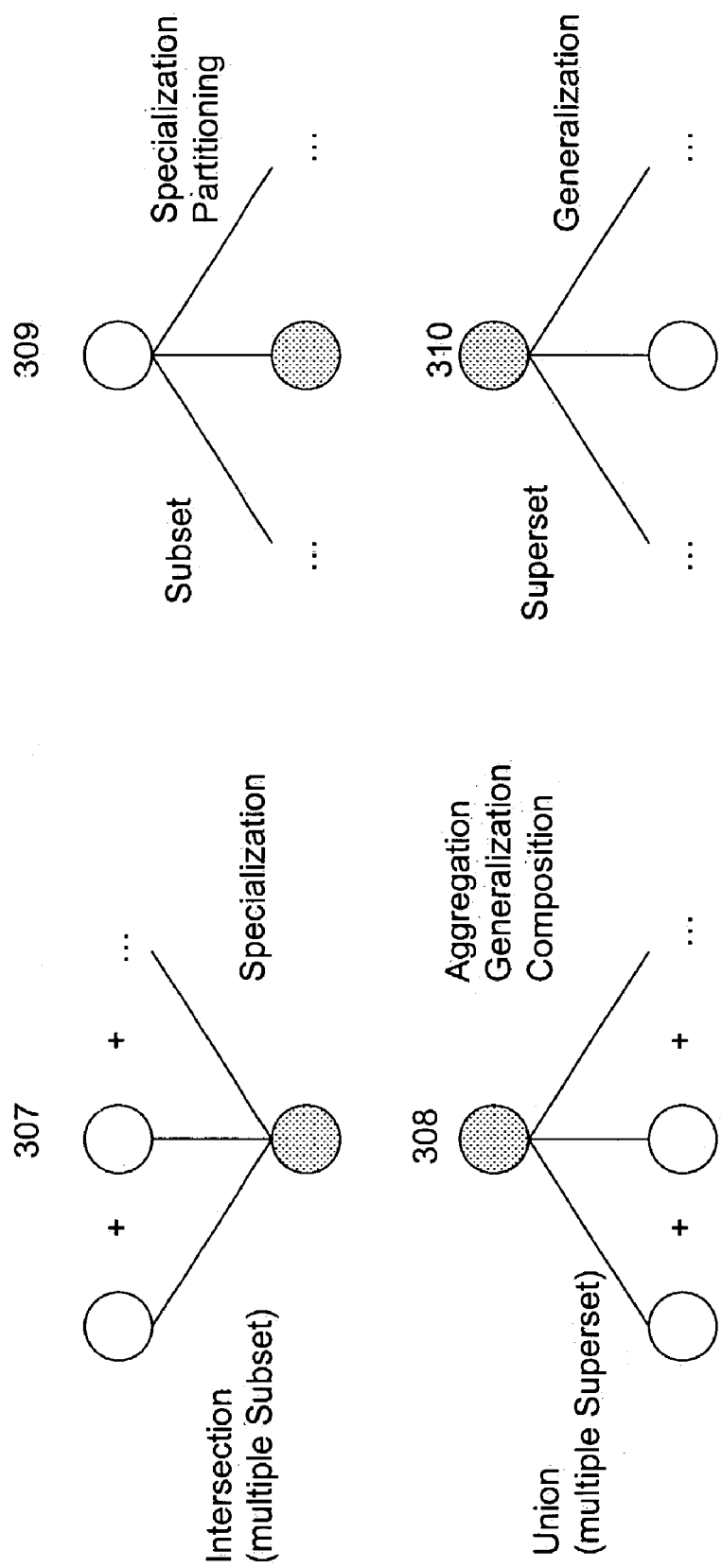
FIG. 3B shows four exemplary space operations that may be used to establish relationships between elements in a model.
Figure 3D:
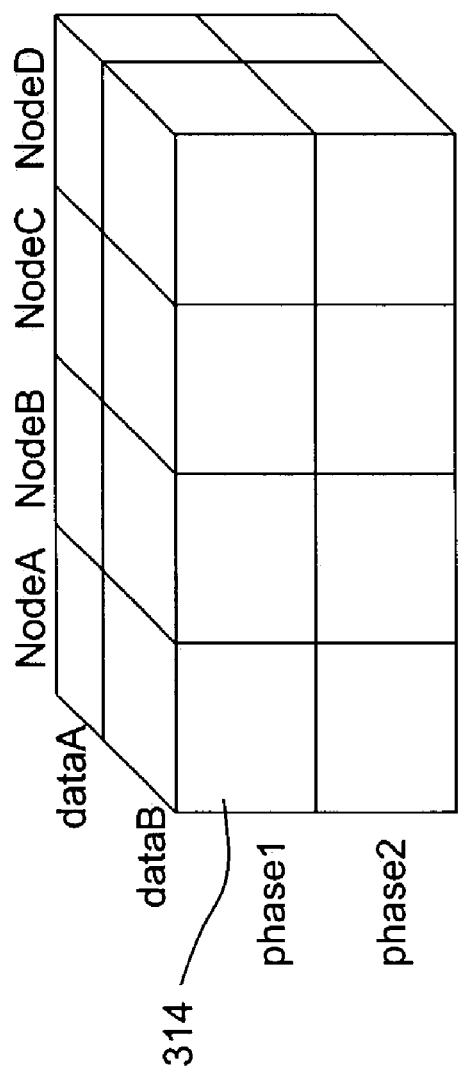
FIG. 3D depicts a collection of cubes with each of the cubes representing possible relationships among three elements.

Further, the relationship elements may be expressed as a result of certain types of operations. Examples of the commonly used operations may be space operations that include intersection, union, subset and superset. FIG. 3B shows these four space operations 307, 308, 309, and 310. For example, when commonly provided data, features or operations are needed from a number of resources, a relationship element can be created to demonstrate an intersection operation 307 among a number of other elements. Likewise, when all data, features or operations are needed from a number of resources, a relationship element can be created to demonstrate a union operation 308 among a number of other elements. The subset operation and superset operations 309 and 310 can be used to move an element down or up one level with respect to its original placement in the mode such that a sub-element or a super-element may be created. Essentially, the model 302 is a collection of elements or relationships among the elements. It should be noted that some of the elements may not pertain to any resources but carry instructions, data, or other information to support the model.

FIG. 3C shows an improved model 310 over that shown in FIG. 3A by including four elements dataA, dataB, phase1 and phase2. It is assumed that the elements dataA and dataB are provided to facilitate the operations of the elements NodeA, NodeB, NodeC and NodeD in two different phases; phase1 and phase2 (the relationships between these four elements with other elements are ignored in the figure). As a result, the improved model 310 can be represented in a 3 dimensional space as a collection of cubes 312 shown in FIG. 3D with each of the cubes representing possible relationships among three elements (e.g., the cubes 314 pertaining to relationships among NodeA, dataB and phase1). Essentially, the 12 elements at the layer 305 in the improved model 310 are categorized into three types of elements in reference to their respective natures, resulting in a 3-dimensional model shown in FIG. 3D.

It can be appreciated by those skilled in the art that a model can be expanded into N dimensions, where N is a number of types of elements or categories the elements may be classified to. By virtue of the present invention, an N-dimension model is thus provided to interconnect all elements. As will be further detailed below, the N-dimension model can be further used as a powerful tool to visualize relationships among all elements. When applied to a particular application, for example, an information technology infrastructure in an enterprise environment, a model being a collection of all computing resources in the enterprise can be used to show all relationships between the computing resources and the status thereof. In other words, the model provides a specific visualization of all resources in the IT infrastructure at any time or a specific time and for any specific criteria.

Figure 3F:
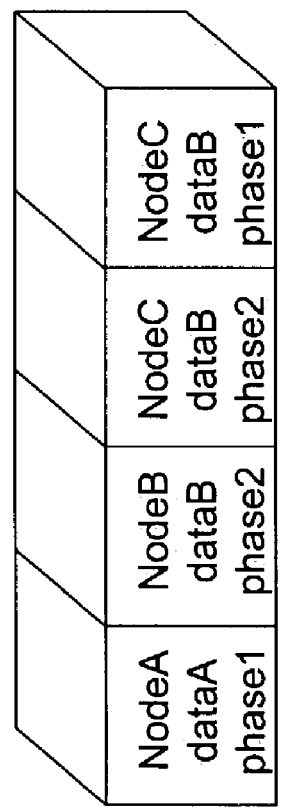
FIG. 3F illustrates a visualization extracted from the model shown in FIG. 3D in accordance with a query or queries.
Figure 3E:
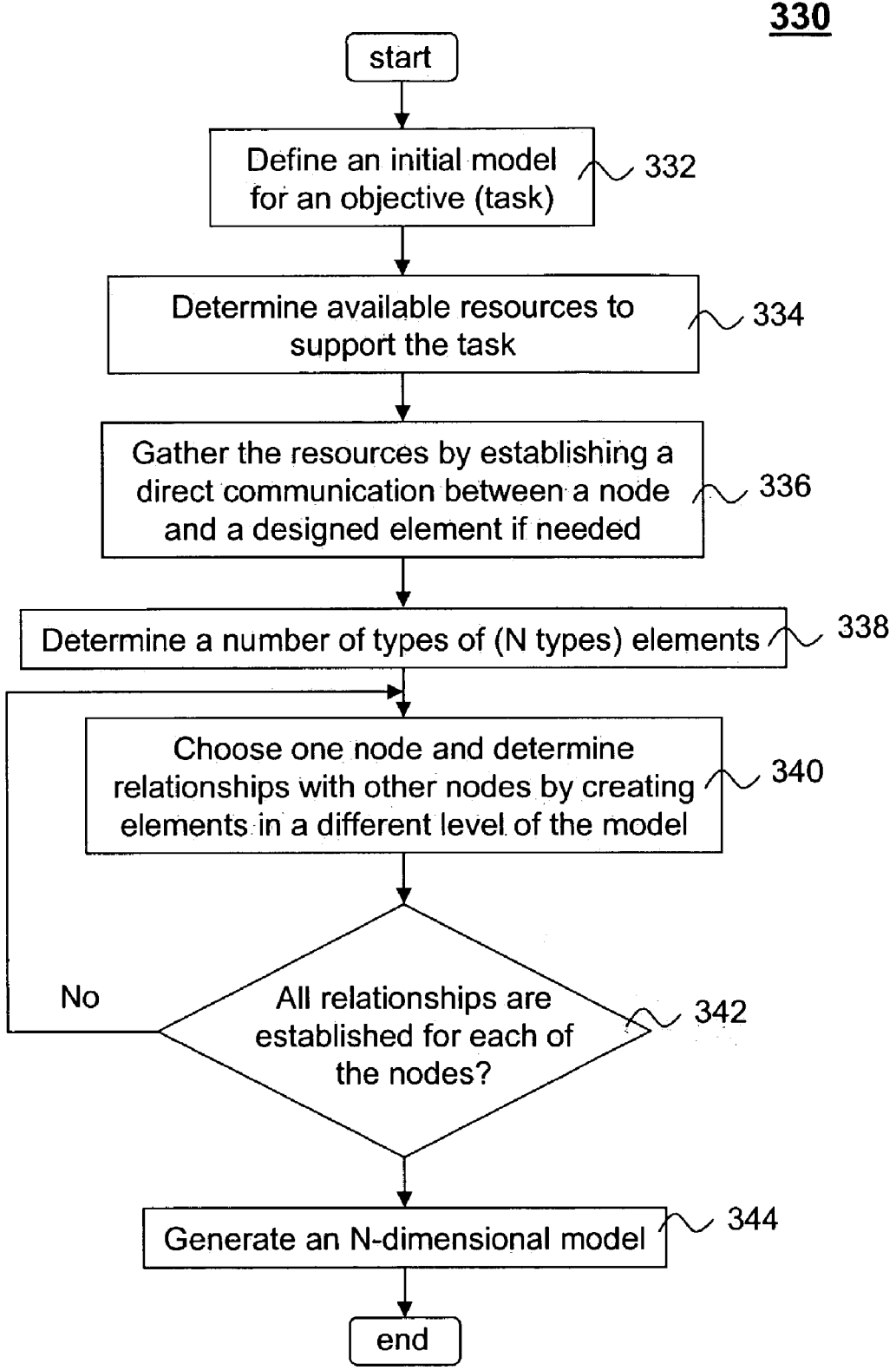
FIG. 3E shows a flowchart or process of generating or establishing a model to model a plurality of distributed resources for a desired task or tasks.

Referring now to FIG. 3E, there shows a flowchart or process 330 of generating or establishing a model of modeling a plurality of resources. In conjunction with the descriptions above and more details below, it can be appreciated that the process 300 can be implemented in software, hardware or a combination of software and hardware. According to one embodiment, the process 330 is implemented in what is commonly called the Eclipse Project (www.eclipse.org) provided by IBM Corporation.

At 332, an initial model for an objective or task is defined, for example, by establishing an initial model that may contain no elements but provides a starting point. The initial model, which is also referred to as a project model, may be named after the task. Instead of "task" 302 in FIG. 3A, it can be named as "Setup", etc. At 334, the available resources to support the task are determined. In general, it needs to determine what a node (or a resource) can contribute to the task. For example, the task is to provide a web service that involves a database and a web application, then at least one of the nodes is an instance of the database and another one is an instance of the web application. Other nodes that may be also included is a node pertaining to instant messaging that provides an interface to receive instructions, data, or commands from a human being. In one embodiment, an invitation with requirements is broadcasted to silicate participating nodes. In another embodiment, an invitation may be initiated to be multicasted to known nodes.

After the nodes are determined or responded to, the information of the resources is gathered at 336. As described above, each resource is addressable by an identifier (e.g., a URI) such that a direct communication session between the model (a node itself) and the node is established using a predetermined communication protocol (e.g., JXTA/TCP/IP). Once necessary elements, each pertains to one of the nodes, are determined, it is now possible to categorize them based on their types, functions or uses at 338. It is assumed that there are N types of elements. It should be noted that the classification of the elements is not necessary in the process 330 but makes it possible to represent the subsequent model in another meaningful way.

At 340, an element is chosen to establish necessary relationships with other elements. Depending on the relationships and/or application of the model, super-elements or sub-elements may be created as a result of the relationships of the chosen element with other elements. At 342, it needs to determine if all of the elements have had relationships established with others. If not, the process 330 goes to 340 to continue with those that have not had the relationships established with others. When all the elements have the relationships established with each other or others, a complete model with N dimensions is generated at 344. Accordingly, the model generated at 344 is also referred to as a logic model.

It should be noted that the names for the elements in a model shown in FIG. 3A or 3C are for illustration purpose. There is no requirement that each of the elements must be named after a corresponding node and each of the elements must pertain to a node and a relationship. In certain cases, an element is used as an instruction, an operation or a piece of data or the relationship carried in the element is a null relationship with other elements. According to one aspect of the present invention, one or more elements in a model can be named after an instruction or a set of data. For example, an element is named as "retrieving a list of test results since last Friday". When such model is access by a human operator from another node, the naming of the element or the instruction is understandable to the human operator. Likewise, an element in a model can also be named as "hello.exe", when the model is accessed from a node, a program called "Hello" will be executed.

Although a model is a collection of elements and relationships among the elements, it is not necessary for each of the elements to pertain to a node or a meaningful relationship between two or more elements. One of the key features in the present invention about the model is that the model can be essentially used to model all types of resources, carry instructions or data or other type of sources to achieve a desired task or for a user or an application to achieve a desired task.

In reality, a resource can be a network, an operating system, a communication layer, an application, a database or a service or content provided from a machine. A resource can also be a phase, a stage, an instruction (human or machine readable) or a human being that interacts with a machine. Accordingly, each of the elements in a model can be expressed in what is called herein metadata. In general, the metadata is expressions or assertions about the properties of and relationships between entities that may physical/concrete and logical/abstract. For example, physical/concrete entities described by such metadata include machines, people, etc. Logical/abstract entities described by such metadata include applications, environment, etc. Without the loss of generality, a piece of metadata may include one or more assertions that a particular instance (e.g. a server software) is running on a particular port number, a particular person has a particular email address or is responsible for security in a particular environment, a particular set of configuration parameters in an environment relate to security, or a particular application requires an environment with particular characteristics in order to proceed.

In one embodiment, the metadata for an element includes one or more statements. At least one of the statements includes a subject, a predicate and an object, each including a URI. In addition, a timestamp may be included in the statement to validate the statement for a predetermined time period. Essentially, the metadata makes it possible to identify, describe, and classify a resource through its ability to construct a statement that links the resource to a specific instance. Given the metadata for each of the elements, it is now possible to represent a model in a graph structure to illustrate the relationships among the elements. With proper interfaces in the metadata, the elements can be rearranged as desired. In operation, an element can be added or deleted without recreating a new model. In one embodiment, the metadata can be translated in a markup language (e.g., XML or HTML) thus to enable easy data access and exchange.

An N-dimensional representation of a model is a very powerful tool that can capture information among all the elements in the model. According to one aspect of the present invention, a mechanism is designed to query the model so that a specific visualization of the relationship among the elements can be extracted. As described above, each node can be also expressed in metadata that include a collection of statements, each of the statements including one or more keywords or a subject, a predicate, and an object, and possibly a time stamp and other expression items. Thus, in one embodiment, a query is designed to include criteria for matching some of the metadata. The criteria allow inputs designed to match one or more of the subject, the predicate, the object, the time stamp and other items in a statement so as to extract elements or relationships between the elements in accordance with the criteria.

There are a number of ways known to those skilled in the art to match a statement or statements. One possible matching process is referred to as a straight match, simply to match none, one, two or all of the items in a statement such that one or more elements are thus selected when the corresponding metadata is matched by a query or a chain of queries.

According to one embodiment, the matching process is configured to match on multiple (enumerated) values or ranges or even arbitrary boolean-value functions. Each element may, in fact, be generalized as a boolean-value function of statement items (e.g., a three boolean-valued function of subject, predicate, and object). Thus an application programming interface (API) may be provided as:

getExactSubject( );
getExactPredicate( );
getExactObject( );

which each return an array (or null). More advanced queries may be designed as well, the details of which are known to those skilled in the art and are thus omitted to avoid obscuring aspects of the present invention.

To further understand the query of an N-dimensional model to extract a visualization therefrom for display (e.g., in 3-dimension or 2-dimension), an example is provided herein. It is assumed that a model is constructed to model a directory of a large number of organizations and includes nodes pertaining to resources scattering over a data network (e.g., the Internet or the extranet). To find email addresses of all employees in one organization "mValent", one may first match triples of the form (X, employer, mValent) and then use the resultant values of X to perform the queries (X, email, Y) to get the desired list as values of Y.

In operations, as a result of one or more queries, a model, regardless of its dimensions, can be extracted to present a visualization including relationships pertaining to the queries. FIG. 3F illustrates a visualization 348 extracted from the model shown in FIG. 3D. The each of the four cubes in the visualization 348 shows the relationships among three elements per the queries, wherein each of the three elements is from a class.

Figure 3G:
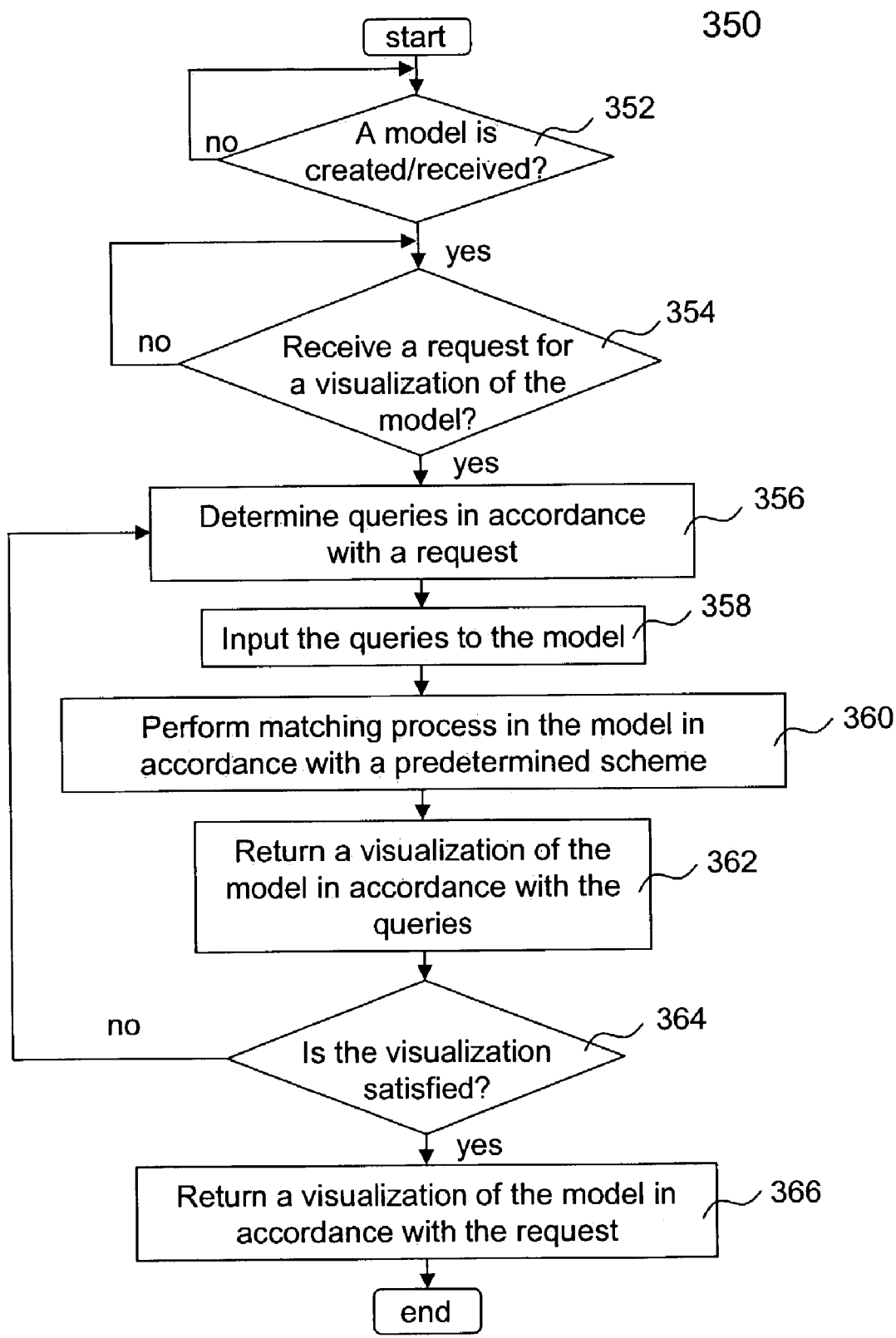
FIG. 3G shows a flowchart or process of generating a visualization of an N-dimensional model in accordance with a query or queries.

FIG. 3G shows a flowchart or process 350 of generating a visualization of an N-dimensional model, such as the one generated from the process 330 of FIG. 3E. In conjunction with the descriptions above and more details below, it can be appreciated that the process 350 can be implemented in software, hardware or a combination of software and hardware. At 352, the process 350 determines if a model is available. In an optional design, the process 350 can be configured to determine if a model created or received is valid in the context of generating a visualization of the model in accordance with a request. It is assumed that the model herein is received or provided and valid.

At 354, the process awaits a request for generating a visualization of the model. The request may be provided by or received from a user. As used herein the user may mean a human user, a software agent, a group of users or a member thereof, a device and/or application(s). Besides a human user who needs to generate a visualization from the model, a software application or agent sometimes needs to generate a visualization as well in order to proceed with a predetermined task. Accordingly, unless specifically stated, the "user" as used herein does not necessarily pertain to a human being. In any case, when a request is received, the process 350 moves to 356 in which queries are constructed. Depending on implementation, the queries may be provided interactively till a desired visualization is produced, inputted from one or more files or human users.

At 358, the queries are provided to the model (e.g., the metadata of the elements therein). At 360, a matching process is executed in the model in accordance with a predetermined matching scheme (e.g., straight matching or approximate matching). A visualization of the model is generated at 362 in accordance with the queries. In general, if the queries are not constructed properly, the visualization may not be so desired. At 364, the visualization is checked, for example, any desired relationships are presented or missing. If it is not what is desired, the process 350 goes back to 356 to revise the queries, thus the revised queries are provided to the model. As a result, a revised visualization is generated at 362 and qualified again at 364. Until qualified or satisfied, the visualization may be regenerated with additional or revised queries. At 366, a satisfied visualization of the model is produced in accordance with the request.

FIG. 4A shows an exemplary graphic environment or platform 400, referred to as mValent Modeling Platform, that may be used to create the logic model 310 of FIG. 3C.

It should be noted that the platform 400 is used to facilitate the understanding of the present invention. Alternations to the platform 400 are possible given the detailed description herein. Depending on a computing environment is which the platform 400 executes, various views and displays (e.g., command line interface) may be configured without departing from the scope of the present invention.

The platform 400 shows a display 402 that is provided to allow a user to create a model (e.g., named as a root) for a desired task. As shown in the figure, the display 402 shows a graphic representation of a project model. The model can be created by introducing a plurality of elements, each pertains to one or more nodes that are distributed and can be configured collectively to support a task. The model can also be created by importing one or more files (e.g., XML or https.conf). In addition to the graphic representation of the model in the display 402, there is a type display 404 allowing the determination of the type of each of the elements and there is an index display 406 allowing the user to see related information about the elements.

According to one embodiment, the display 402 is configured to facilitate the establishment of relationships between the elements or creations of sub-elements or super-elements. The display 412 in FIG. 4B shows that the model is partially expanded and the relationships between some of the elements can be seen. For example, under the element NodeA 410, there are four respective relationships between NodeA and other four individual or group elements, the individual elements being dataA and dataB, the group elements being (NodeB, NodeC, NodeD, phase1) and (NodeB, NodeC, NodeD, phase2).

Under the display 402, each of the elements is expressed by metadata. In order words, the characteristics of an element are described in the corresponding metadata. As part of the index display 406, a properties display 412 is used to show the corresponding properties and value of a selected element. As shown in the display 412, when the element dataA 411 is selected, its property and associated values are revealed (e.g. from the metadata). Essentially, each of the elements in the display 410 has its own properties and associated values and can be shown in the properties display 406. Further, those elements representing the relationships of others have their composite properties and values and can be displayed as well. For example, the group element NodaA-NodeB_NodeC_Node_D_phase1 413 has composite properties (not shown in figure) respectively from the elements NodeA, NodeB, NodeC, NodeD, and phase1. Alternatively, a display can be configured to display a visualization of the model according to a set of queries.

According to one embodiment of the present invention, one or more other nodes can be invited to work on a model. FIG. 4C shows another display 420 in the platform 400 that shows status of a number of nodes that have been invited to develop, manage or update the model in the display 402. In operations, the hosting node is configured to send an invitation request to a node to invite the node to develop, manage or update the model in a collaborative manner. In one embodiment, the invitation includes access control information or a timer. The access control is provided to control the access from the invited node so that only permitted actions may be performed to the model. The timer allows the abandonment of the communication between the hosting node and the invited node.

Upon receiving the invitation request, the node being invited is determined whether to access the request or not. In the case in which the node is determined to access the invitation request, the node responds with an acceptance response that facilitates to establish a communication session with the hosting node. According to one embodiment, the mutually agreed communication protocol between the nodes is JXTA. In any case, a user on the invited node may access the model depending on an access control placed thereupon. If the access control permits, the user can develop the model by introducing additional nodes or models, update the model by deleting or adding one or more elements, reestablishing relationships among the elements and etc. Alternatively, such access may be revoked subject to a term.

Specifically, as examples, as shown in 420 of FIG. 4C, an invitation request has been sent to "john" (a user or node name) and is pending to the acceptance by "john". A user or node named "mary" has accepted an invitation and joined in as a collaborative node to work on the model in the display 402. Although, a node referred to as "data source" was invited but the communication thereto has expired, perhaps, due to a timer, "data source" is no longer accessible but can certainly be re-invited if needed. A user or node referred to as "Dir", although accepted, has restricted access and may perform certain type of actions to the model in the display 402. It should be noted that FIG. 4C shows exemplary statuses of collaborative nodes. Given the description herein, those skilled in the art can appreciate that there are other possible expressions or implementation to show or control the status of the invited nodes. In addition, it is also possible for the model to be invited as an instance of resource to another model.

Referring now to FIG. 5A, there shows an exemplary configuration 500 for deploying a software product. The configuration 500 includes three collective stages, a development stage 502, a pre-production (QA) stage 504 and a production stage 506, although other divisions of a process of producing a software product is possible, such as design, build, test and deploy. Each of the stages represents a collective effort to achieve a certain status of the product or a desired task. In particular, the development stage 502 represents that the product is designed and developed by developers (e.g., software engineers), the pre-production stage 504 represents that necessary testing or quality control are applied to the product developed in the development stage 502, and the production stage 506 represents a production cycle in which the product is configured in stable conditions and ready for massive productions.

In general, the environment or setup requirement for each of the three stages is different as required by respective efforts towards the goal of deploying the software product. For example, the developers in the development stage 502 create a setup 508 only to facilitate their development needs while testing engineers in the pre-production stage 504 may create a setup 510 only to facilitate their testing needs and the same to the production stage 506. If, for some reason, a parameter in the product is adjusted in the pre-production stage 504, it is difficult to transmit the adjustment to the development stage 502 or the production stage 506. It is indeed sometimes problematic to have the developers or production people to incorporate the parameter made in the pre-production stage 504. As a result, a next version of the product from the development stage 502 may overlook the parameter and the pre-production stage 504 has to again enter the adjusted parameter.

Alternatively, due to the different setups 508, 510 and 512, the developers may not find a need for the parameter to be adjusted. In reality, many adjustments in the development stage 502 may not demonstrate their significance in other stages since the setup for the development stage 502 is different from the pre-production stage 504 and the production stage 506. In reality, various problems, difficulties, incompatibilities or issues can be experienced in the three stages that, nevertheless, work on the same product, resulting in high overhead, inefficiency and delayed time to production.

FIG. 5B shows one aspect of the present invention that can be used to solve or minimize many of the problems that may be experienced in FIG. 5A. Instead of having a different setup for each of the stages, the development stage 522, the pre-production stage 524, and production stage 526 share a centric setup 528 such that communications among the stages can be made seamlessly. Essentially, anything that have adjusted, changed or updated in one stage can be effectively reflected in the setup which is depended upon by other stages. Depending on implementation, the other stages may act on the changes transparently or non-transparently.

According to one embodiment, the centric setup or environment is based on a model including a plurality of elements that may be viewed as at least three groups. Each of a first group of elements pertains to an instance of the stage or a local setup of the stage. Each of a second group of elements represents a relationship of one element with others elements in the first group. Each of a third group of elements carries instructions, data, necessary operations or expressions for.

Figure 5C:
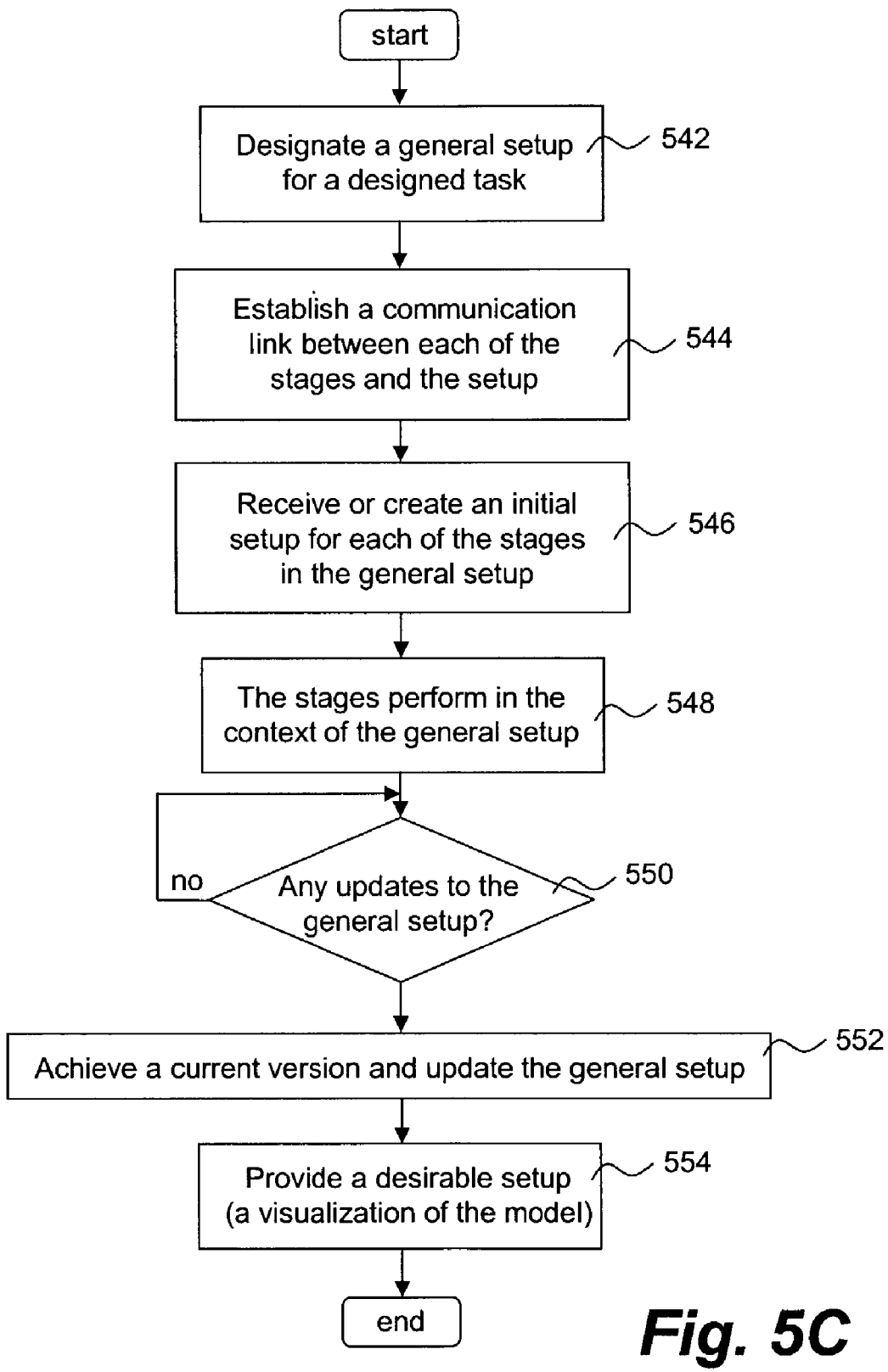
FIG. 5C shows a flowchart or process of creating a centralized setup based on a logic model.

FIG. 5C shows a flowchart or process 540 in accordance with FIG. 5B. With more detailed descriptions to follow, it can be appreciated that the process 540 can be implemented as a system, a process, a software product, architecture or a combination of any of these and executed in a single machine or in a distributed manner. In operations, a general setup is created or designated at 542 in accordance with one aspect of the present invention pertaining to creating a logic model as described above. According to one embodiment of the present invention, the general setup is located on a rendezvous from which all participating stages can access.

To facilitate communications among the stages and the general setup, a communication link is preferably established between each of the stages and the general setup at 544. The general setup, also referred to as a logic setup, is based upon an initial setup or a project setup at 546, wherein the initial setup can be newly created or based upon one or more of the setups for the stages. When each of the stages is considered as one or more resources and represented as one or more nodes, the general setup is a logic model to model the stages and the relationships between and among the stages. Instead of executing in a respective setup for a stage, each of the participating stages can now be configured to execute at 548 in the context of the general setup and is subject to changes progressively over time.

At 550, the general setup awaits any updates from any of the participating stages. If an adjustment has to be made in one of the stages, the adjustment will be reflected in the general setup at 552. According to one embodiment, a version of the general setup that is replaced by a new version can be archived as such a recovery thereof is always possible in the case that the new version is not desirable.

Figure 5D:
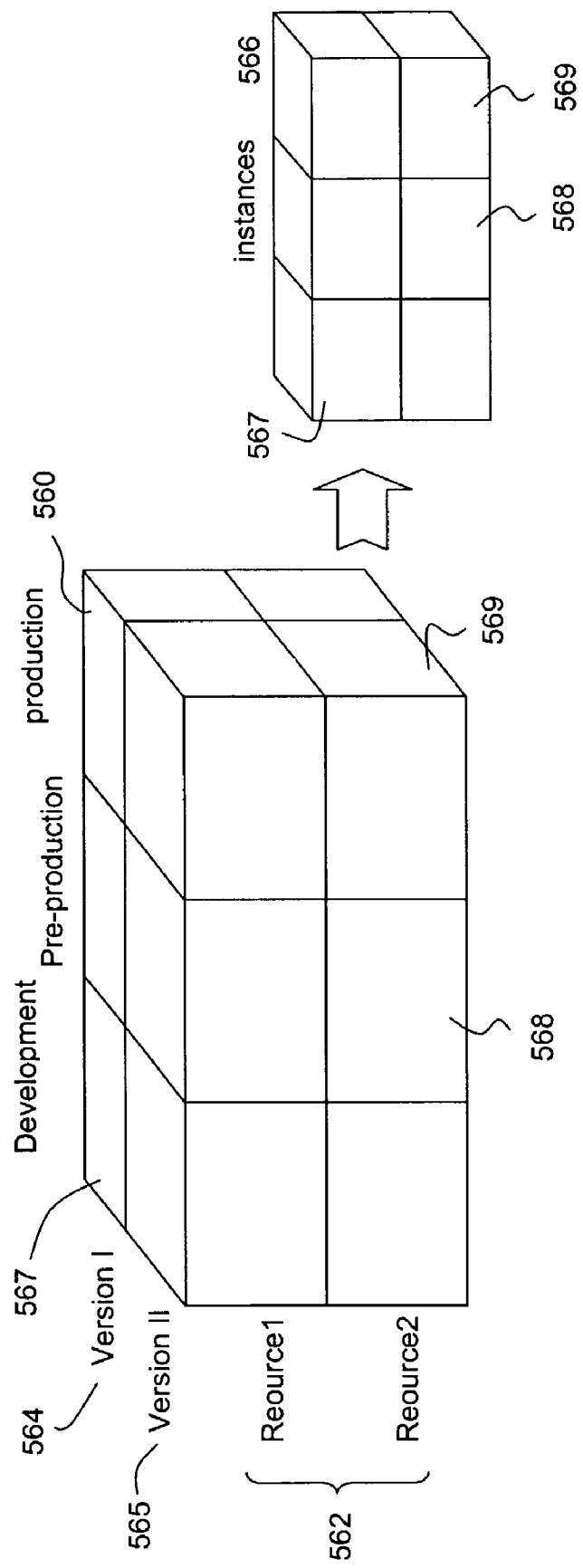
FIG. 5D illustrates a collection of two versions of relationships between the stages and two resources.

FIG. 5D illustrates a collection 560 of two versions of relationships between the stages and two resources. It is assumed that there are two resources Resource1 and Resource2 (e.g., a database and a set of data) that are needed for each of the stages to perform its own part in the project of deploying the software product. It is further assumed that, over the course of the project, there are two versions 564 and 565 of the resources. In the context of modeling the stages, the resources and the versions, the general setup can be graphically represented by 12 cubes, each being a relationship among three elements. In other words, the 12 cubes 560 is a collection of instances of the stages, the resources and the versions and their respective inter-relationships.

Applying the process 350 of FIG. 3G, a visualization or composite version 566 of the 12 cubes 560 may be generated in accordance with a query or queries. For example, the composite version 566 comprises a cube 567 from Version I of Resource1 for the development stage, a cube 568 from Version II of Resource2 for the pre-production stage, and a cube 569 from Version II of Resource2 for the production stage.

It should be noted that the process FIG. 5C can be applied to other infrastructures other than the software product deployment illustrated in FIG. 5B. One of the advantages, benefits and features of the present invention is the mechanism provided to support a collaborative environment that utilizes available resources. The resources may be located across a network or unknown prior to being called upon into a model for a desired task. In the case that no resources are predetermined, criteria with conditions may be distributed to a network or a community, those resources willing or configured to support the task may response to the criteria and thus their address identifiers are provided to join in the model.

One of the challenges in IT arena is to manage an enterprise website that may have grown into a giant collection of files linked by URI, URL or other connections, each of the files may further refer to resources beyond one computing machine. The website is constantly updated so as to provide useful and updated services and values to internal or external employees or customers. With the updates over the years, the "interrelated" files to support the website can be so huge but fragile that a small error introduced in one update may render the website to stop or malfunction due to rippling effects across multiple files. In reality, numerous error-and-trial tests would have to be carried out before an update can be actually deployed.

Figure 6:
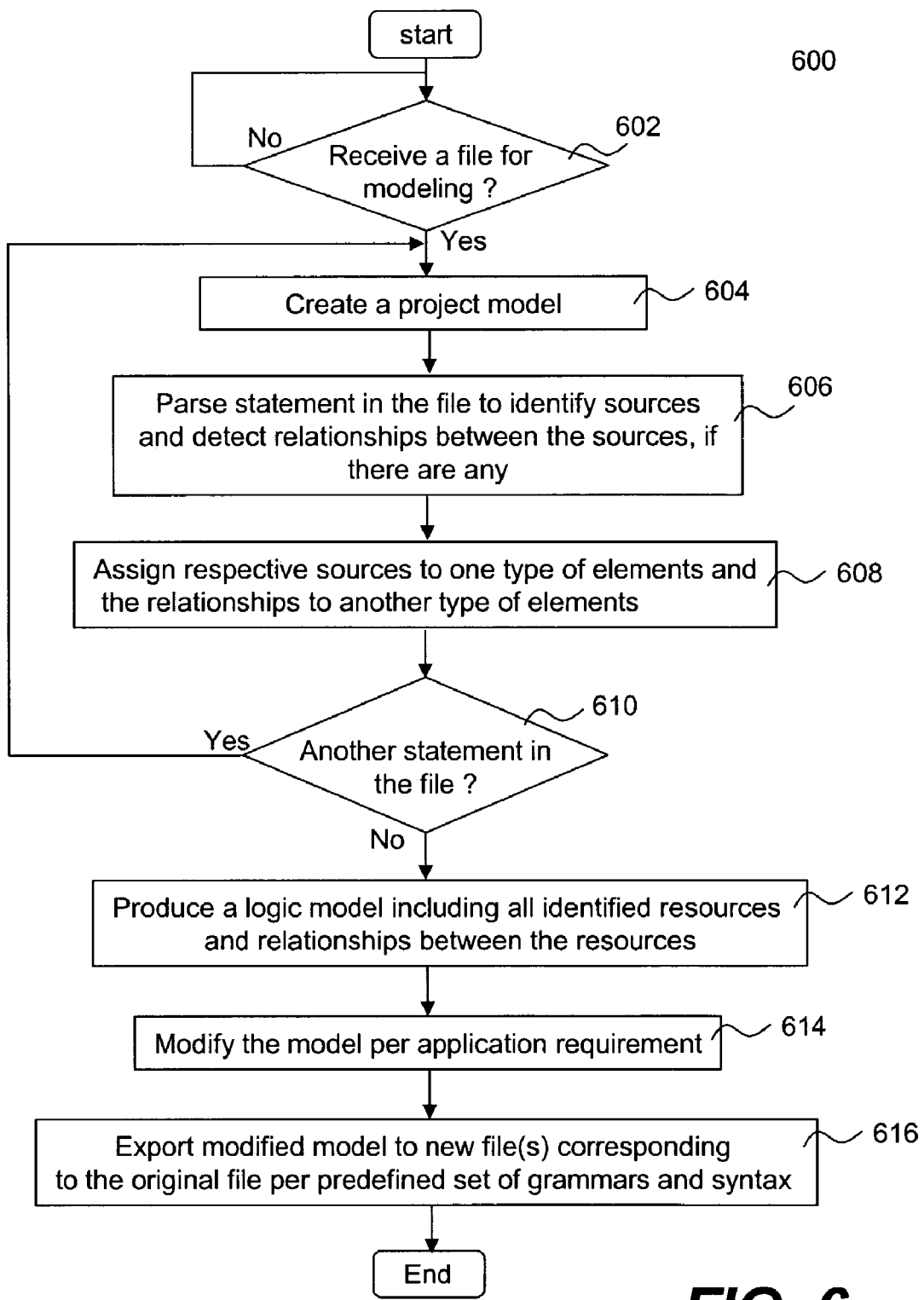
FIG. 6 shows a flowchart or process of managing a website using the modeling mechanism described herein.

One aspect of the present invention is to provide a tool mechanism to facilitate the management of the website (i.e., the underlying files). Instead of manually updating individually each or all affected files to effectuate an update or updates, a model is created to model all resources in the files supporting the website and provide a visualization of relationships among the resources. FIG. 6 shows a flowchart or process 600 of managing a website using the modeling mechanism described herein. With the above descriptions, it can be appreciated that the process 600 can be implemented as a system, a process, a software product, architecture or a combination of any of these and executed in a single machine or in a distributed manner.

In general, a website is controlled by at least one configuration file in a root directory (e.g., wwwroot). The configuration file (e.g., web.config) is typically written in descriptive language, such as XML, HTML or simply in a text file and comprise statements, each can be comments, declarations, assignments, instructions, data, computations, in accordance with a predetermined set of grammars and syntax. At least, there is one resource is referred to in a configuration file for a fairly sophisticated website. For example, after a certain condition is met, a process is let to:

```
{...
instance          7
port:          3000
...}
``` which means a resource named as 7 and another one located at 0999 are called upon or activated.

Referring now to FIG. 6, at 602, the process 600 determines if such file is presented or valid. One of the purposes here is to produce a logic model out of the configuration file. According to one embodiment, the file is checked with its name extension and/or syntax to ensure that the received file is valid. If the file is not constructed according to a predetermined set of grammars and syntax, the process 600 returns, perhaps with an error message, awaits a next valid file. It is assumed that the file or files for modeling are valid hereinafter. The process 600 goes to 604 wherein a project to be associated with the file or files is created.

At 606, the statements in a file are respectively parsed, in accordance with the predetermined set of grammars and syntax, to identify resources being referred to and any relationships between the resources in the file. It is understood to those skilled in the art that a parsing process can be configured to ignore unrelated statements (e.g., comments and declarations) given the known set of grammars and syntax. For the above example, the resource named as 7 and the resource located at 0999 are of interest and thus identified. At 608, each of the identified resources is assigned as an element (primary) and each of the relationships, if there are any, among the resources is assigned as an element (relationship) as well. At 610, the file is continued till a last statement is reached. If there are more files, the process 600 may be repeated from 602 to 610 to identify all resources and their relationships with each other presented in the files.

At 612, a logical model utilizing all the resources identified is created. If the platform 400 of FIG. 4A is utilized, the logical model can be displayed in the window 402 of FIG. 4A. With the logical model displayed, the management of the website becomes a lot controllable. There are many operations that may be carried out and verified visually at 614. For example, elements in the model can be deleted, added or revised to create a revised logical model, another configuration or model may be added as well to be combined with the current model. At 616, the revised model can be exported, in the same grammars or syntax, to files corresponding to the original files.

Significantly different from the prior art systems in which any changes to a configuration file would not be instantly verified, the process 600 allows changes to be visualized and instantly verified. For example, when a change is made, resulting in one element in the model isolated (lost relationships to others), which means, unless for the purpose, that the change will ultimately affect the function of the website because the source is no longer depended upon. Those skilled in the art can appreciate that there are numerous advantages, benefits and features that can be enjoyed from the modeling mechanism in managing an enterprise website.

The present invention has been described in sufficient detail. The processes, sequences or steps and features discussed above are related to each other and each is believed independently novel in the art. The disclosed processes, sequences or steps and features may be performed alone or in any combination to provide a novel and unobvious system or a portion of a system. It should be understood that the processes, sequences or steps and features in combination yield an equally independently novel combination as well, even if combined in their broadest sense, i.e., with less than the specific manner in which each of the processes, sequences or steps and features has been reduced to practice.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A method for providing a collaborative environment for producing a software product, the method comprising:

determining respective stages for producing the software product, the respective stages having no overlapping between any two of the stages in a sense that each of the stages does not depend on any other one of the stages and operates independently;

creating a model of multi-dimensions including a plurality of first elements in one dimension and second elements in another dimension, each of the first elements pertaining to an instance of an environment for one of the stages, and each of the second elements representing a relationship between or among the first elements; and synchronizing each of the first elements with one of the stages, wherein the model is accessible by each of the stages such that a change or update made in one of the stages can be propagated to other ones of the stages.

2. The method of claim 1, wherein each of the stages is configured to achieve a predetermined status of the software product.

3. The method of claim 2, wherein the stages include at least three collective stages: development stage, quality control stage and production stage.

4. The method of claim 3, wherein an adjustment to the software product in one of the three stages is transparently propagated to other two of the three stages.

5. The method of claim 1, wherein the environment of each of the stages includes requirements for a predetermined status of the software product for the each of the stages, installing or configuring components, and loading data if there is any to facilitate achievement of the predetermine status of the software product.

6. The method of claim 5, wherein the environment of each of the stages is a setup for executing one or more applications or tools.

7. The method of claim 1, wherein the model facilitates communications between one of the stages and another one of the stages, such communications would not be possible without the model.

8. The method of claim 7, wherein the model is a collection of respective setups and relationships between the setups, each of the setups is for executing one or more applications or tools required in one of the stages.

9. The method of claim 8, wherein the model is applicable to each of the stages, synchronizes changes and facilitates communications among the stages, thus greatly improving collaborations, communications and efficiency among the stages.

10. A method for providing a collaborative environment for producing a software product, the method comprising:

providing respective setups for a plurality of stages for producing the software product, the stages having no overlapping between any two of the stages in a sense that the setups are mutually exclusive and operate independently;

inviting each of the setups as one of first elements in a model created in a machine accessible by each of the stages, wherein the model is in multi-dimensions with the first elements being in one dimension;

creating a plurality of second elements in the model, each of the second elements as another dimension of the model, representing a relationship between or among the first elements;

creating a plurality of third elements, each of the third elements as still another dimension of the model, carrying at least an instruction or data if the instruction or data is required in at least one of the stages; and wherein the second and third elements are at an identical level as the first elements, a level below the first elements or a level above the first elements.

11. The method of claim 10 further including synchronizing each of the first elements with one of the stages, wherein the model is accessible by each of the stages such that a change or update made in one of the stages can be propagated to other ones of the stages.

12. The method of claim 11, wherein the setups of each of the stages includes requirements for a predetermined status of the software product for the each of the stages, installing or configuring components, and loading data if there is any to facilitate achievement of the predetermine status of the software product.

13. The method of claim 12, wherein the model provides an appropriate environment for executing one or more applications or tools for one of the stages.

14. The method of claim 10, wherein the model facilitates communications between one of the stages and another one of the stages, such communications would not be possible without the model.

15. The method of claim 14, wherein the model is applicable to each of the stages, synchronizes changes and facilitates communications among the stages, thus greatly improving collaborations, communications and efficiency among the stages.

16. The method of claim 15, wherein the first, second and third elements in the model are graphically presented such that various view of the model is possible to snapshot a status of the software product or relationships of the stages.

17. A software product including computer programs to be executed in one or more computing machines for providing a collaborative environment for producing a software product, the software product comprises;

program code for determining respective stages for producing the software product, the respective stages having no overlapping between any two of the stages in a sense that each of the stages does not depend on any other one of the stages and operate independently;

program code for creating a model of multi-dimensions including a plurality of first in one dimension and second elements in another dimension, each of the first elements pertaining to an instance of an environment for one of the stages, and each of the second elements representing a relationship between or among the first elements;

program code for synchronizing each of the first elements with one of the stages, wherein the model is accessible by each of the stages such that a change or update made in one of the stages can be propagated to other ones of the stages.

18. The software product of claim 17, wherein the stages include at least three collective stages: development stage, quality control stage and production stage.

19. The software product of claim 18, wherein the environment of each of the stages includes requirements for a predetermined status of the software product for the each of the stages, installing or configuring components, and loading data if there is any to facilitate achievement of the predetermined status of the software product.

20. The software product of claim 19, wherein the environment of each of the stages is a setup for executing one or more applications or tools.

21. The software product of claim 17, wherein the model facilitates communications between one of the stages and another one of the stages, such communications would not be possible without the model.

22. The software product of claim 21, wherein the model is applicable to each of the stages, synchronizes changes and facilitates communications among the stages, thus greatly improving collaborations, communications and efficiency among the stages.

* * * * *